(12) United States Patent
French et al.

(10) Patent No.: US 8,201,448 B2
(45) Date of Patent: Jun. 19, 2012

(54) GRAVITY GRADIOMETER WITH TORSION FLEXURE PIVOTS

(75) Inventors: John Barry French, Oakville (CA); Kieran A. Carroll, Brampton (CA)

(73) Assignee: Gedex Inc., Mississauga, Ontario (CA)

( * ) Notice: Subject to any disclaimer, the term of this patent is extended or adjusted under 35 U.S.C. 154(b) by 131 days.

(21) Appl. No.: 12/604,775

(22) Filed: Oct. 23, 2009

(65) Prior Publication Data

US 2010/0101322 A1    Apr. 29, 2010

Related U.S. Application Data

(60) Provisional application No. 61/108,268, filed on Oct. 24, 2008, provisional application No. 61/108,271, filed on Oct. 24, 2008.

(51) Int. Cl.
*G01V 7/00* (2006.01)
(52) U.S. Cl. .................................... 73/383; 73/382 R
(58) Field of Classification Search ............. 73/383, 73/382 G, 382 R
See application file for complete search history.

(56) References Cited

U.S. PATENT DOCUMENTS

| | | | |
|---|---|---|---|
| 3,273,397 A | | 9/1966 | Forward |
| 3,564,921 A | | 2/1971 | Bell |
| 3,722,284 A | * | 3/1973 | Weber et al. ................ 73/382 R |
| 4,215,578 A | * | 8/1980 | Lautzenhiser ............... 73/382 G |
| 5,505,555 A | * | 4/1996 | Van Kann et al. ............. 403/291 |
| 5,668,315 A | * | 9/1997 | Van Kann et al. ............ 73/382 G |
| 5,804,722 A | * | 9/1998 | Van Kann et al. ............ 73/382 G |
| 5,817,939 A | * | 10/1998 | Lumley et al. ................ 73/382 R |
| 6,776,042 B2 | * | 8/2004 | Pike et al. ..................... 73/514.32 |
| 7,360,419 B2 | * | 4/2008 | French et al. ................ 73/382 G |
| 7,559,149 B2 | * | 7/2009 | Van Kann .................... 33/366.25 |
| 7,562,460 B2 | * | 7/2009 | Van Kann et al. ........... 33/366.25 |
| 7,562,461 B2 | * | 7/2009 | Van Kann .................... 33/366.25 |
| 7,571,547 B2 | * | 8/2009 | Van Kann et al. ........... 33/366.25 |
| 7,581,327 B2 | * | 9/2009 | Van Kann et al. ........... 33/366.25 |
| 7,584,544 B2 | * | 9/2009 | Van Kann et al. ........... 33/366.25 |
| 7,596,876 B2 | * | 10/2009 | Van Kann .................... 33/366.25 |
| 7,624,635 B2 | * | 12/2009 | Van Kann et al. ............ 73/382 R |

(Continued)

FOREIGN PATENT DOCUMENTS

WO    2007/012192 A1    2/2007

(Continued)

OTHER PUBLICATIONS

International Search Report dated Feb. 16, 2010 from the Canadian Patent Office concerning counterpart International Application No. PCT/CA2009/001526.

(Continued)

*Primary Examiner* — Hezron E Williams
*Assistant Examiner* — Samir M Shah
(74) *Attorney, Agent, or Firm* — Panitch Schwarze Belisario & Nadel LLP

(57) ABSTRACT

A quadrupole responder for an OQR-type gravity gradiometer comprises a housing, and a mass quadrupole positioned within the housing. The mass quadrupole has a pair of sides, and also has a center of mass between the sides. At least a pair of torsion spring flexures are provided by pins connecting said side of said mass quadrupole to the housing. The torsion spring flexures provide an axis of rotation which passes through the center of mass of the mass quadrupole and through both spring flexures. The pins are integral with the mass quadrupole.

38 Claims, 12 Drawing Sheets

U.S. PATENT DOCUMENTS

| | | | | |
|---|---|---|---|---|
| 7,627,954 | B2 * | 12/2009 | Van Kann et al. | 33/366.24 |
| 7,637,153 | B2 * | 12/2009 | Van Kann et al. | 73/382 G |
| 7,714,584 | B2 * | 5/2010 | Van Kann | 324/330 |
| 7,784,343 | B2 * | 8/2010 | Van Kann et al. | 73/382 G |
| 7,788,974 | B2 * | 9/2010 | Van Kann et al. | 73/382 R |
| 7,814,790 | B2 * | 10/2010 | Van Kann | 73/382 G |
| 7,823,448 | B2 * | 11/2010 | Van Kann et al. | 73/382 G |
| 7,823,449 | B2 * | 11/2010 | Van Kann et al. | 73/382 G |
| 7,849,739 | B2 * | 12/2010 | Van Kann et al. | 73/382 G |
| 7,874,358 | B2 * | 1/2011 | Breukelman et al. | 166/250.16 |
| 2006/0207326 | A1 | 9/2006 | Moody et al. | |
| 2007/0051175 | A1 * | 3/2007 | French et al. | 73/382 G |
| 2010/0101322 | A1 * | 4/2010 | French et al. | 73/383 |

FOREIGN PATENT DOCUMENTS

| | | |
|---|---|---|
| WO | 2008/061280 A1 | 5/2008 |
| WO | 2008061279 A1 | 5/2008 |

OTHER PUBLICATIONS

Notification of Transmittal of the International Search Report and the Written Opinion dated Feb. 16, 2010 from the Canadian Patent Office concerning counterpart International Application No. PCT/CA2009/001526.

Robert L. Forward et al., "Rotating Gravity Gradiometer Study", Hughes Research Laboratories, 1976.

Robert L. Forward et al., "Rotating Gravity Gradiometer Study", Hughes Research Laboratories, Apr. 30, 1982.

Van Kann et al, "Laboratory Tests of a Mobile Superconducting Gravity Gradiometer", Phisica B, vol. 165, pp. 93-94, 1990.

Robert L Forward, "Future Lunar Gravity Measurements", Earth, Moon, and Planets, vol. 22, No. 4, pp. 419-433, 1980.

Ho Jung Paik, "Superconducting Tensor Gravity Gradiometry for Satellite Geodesy and Inertial Navigation", The Journal of the Astronautical, vol. XXIX, No. 1, pp. 1-18, Jan.-Mar. 1981.

Moody et al., "A Superconducting Gravity Gradiometer for Inertial Navigation", in Proc. IEEE 2004 Position Location and Navigation Symposium (Plans 2004), pp. 775-781, Apr. 2004.

E.R. Canavan et al., Abstract from "Superconducting Gravity Gradiometer for Airborne Survey" presented at the American Geophysical Union Fall Meeting, Dec. 1995.

Moody et al., "Principle and Performance of a superconducting angular accelerometer", Review of Scientific Instruments, vol. 74, Issue 3, pp. 1310-1318, Mar. 2003.

* cited by examiner

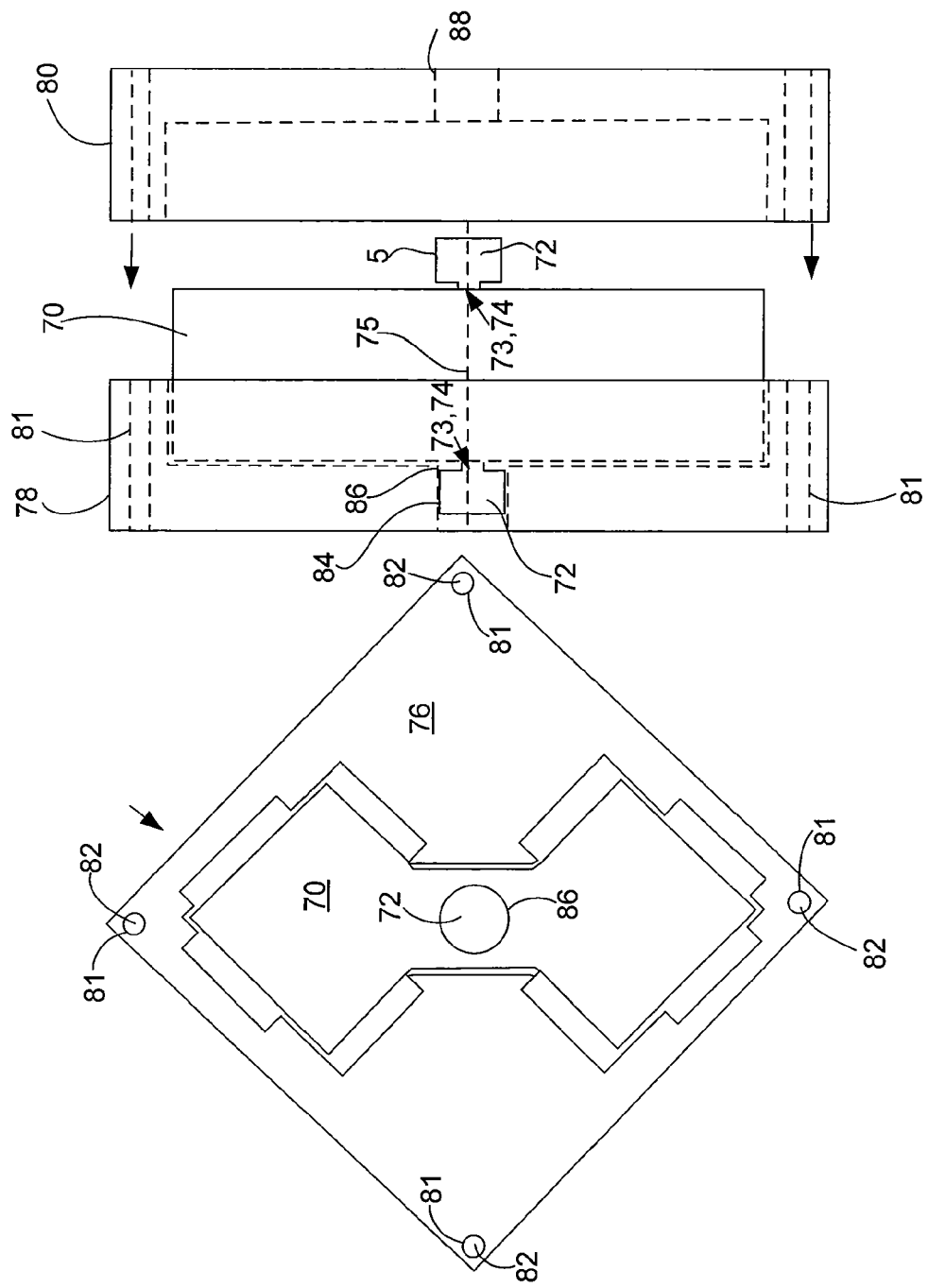

GRAVITY GRADIOMETER WITH TORSION FLEXURE PIVOTS

CROSS REFERENCES TO RELATED APPLICATIONS

This application claims priority from U.S. Provisional Patent Application Nos. 61/108,268 and 61/108,271, which are incorporated herein by reference in their entirety.

FIELD

This specification relates to a gravity gradiometer.

BACKGROUND

Gravity gradiometers have existed for many years and are used to measure variations in the gradients of the earth's gravitational field. Gravity gradiometers may be used in exploration for minerals and hydrocarbons, since deposits of these things in the earth, and variations in the underground structure containing the deposits, produce variations in gravity and in the gravitational gradients which if interpreted correctly can lead to valuable discoveries. The ability to operate a gravity gradiometer in a moving vehicle is desirable, since doing so can greatly decrease the amount of time needed to carry out a survey of a given site.

The variations in the gravity gradients which must be measured are extremely small in magnitude and therefore require very sensitive, low noise instruments with very repeatable response characteristics. Moreover, when the gravity gradiometer is mounted in a moving vehicle, the signals due to these gravity gradient changes are very small in comparison to the undesirable responses of the instrument produced by accelerations and rotational motions of the vehicle on which the instrument is mounted.

The reported performance of present commercially operating airborne gravity gradiometers is currently limited to an error level of about three to four Eotvos (1 E=a gradient of $10^{-9}$ meters per second squared per meter, approximately $10^{-10}$ g per meter) at a signal averaging time of six seconds, when operating in very low-turbulence flying conditions, with performance degrading as turbulence increases. Although this performance has been sufficient to hint at the potential usefulness of airborne gravity gradiometry, improvement to a performance level of 1 E averaged once per second is believed to be required for widespread successful application in mineral exploration.

A known form of gravity gradiometer which has the laboratory demonstrated potential to provide this performance gain is the so-called orthogonal quadrupole responder (also referred to here as an OQR, and also known as the cross-component gravity gradiometer). In the OQR, two orthogonally oriented mass quadrupoles (also referred to here as balance beams), each being a body whose mass is distributed in such a way that it has non-equal mass quadrupole moments along two axes that are orthogonal to each other and to a desired rotation axis, are attached to a housing springs whose mutual alignment defines the desired rotation axis, thus comprising quadrupole responders (also sometimes called angular accelerometers). The balance beams rotate differentially (in opposite directions) in response to changes in certain gravity gradient tensor components, but rotate in common mode (both in the same direction) in response to rotational acceleration motions of the housing. Thus, in principle, when the housing is mounted in a vehicle the OQR separates the weak gravity gradient signals from the much larger noise due to vehicle angular accelerations.

Early versions of a rotating version of an OQR gravity gradiometer design have been disclosed by Weber, Zipoy and Forward in U.S. Pat. No. 3,722,284, and by Robert L. Forward, "Future lunar gravity measurements," Earth, Moon, and Planets, Volume 22, No. 4 (1980) pp. 419-433, and by Lautzenhiser in U.S. Pat. No. 4,215,578. Ho Jung Paik, in "Superconducting tensor gravity gradiometry for satellite geodesy and inertial navigation," The Journal of the Astronautical Sciences, Volume XXIX, No. 1, pp. 1-18, January-March 1981, presented a description of a Cross Component Gradiometer (discussion on p. 7, and FIG. 4), which is topologically equivalent to Forward's design, but which utilizes superconducting materials, inductive gap-sensing coils and SQUID transducers in order to achieve a high signal to noise ratio without needing to have the entire instrument rotate. A later version also employing superconducting materials is disclosed by Van Kann and Buckingham in U.S. Pat. No. 5,668,315, and is described as an OQR by Van Kann et al., "Laboratory tests of a mobile superconducting gravity gradiometer", Physica B, Volume 165 (1990) pp. 93-94. In Moody, Paik & Canavan, "Principle and performance of a superconducting angular accelerometer", Review of Scientific Instruments, Volume 74, Issue 3 (2003) pp. 1310-1318, details of a built and tested superconducting angular accelerometer are described, a pair of which can be used to form an OQR gravity gradiometer.

Existing examples of OQR gravity gradiometers make use of cryogenic temperatures, both to permit the use of SQUID (Superconductive Quantum Interference Device) based detection of the quadrupole responders' motion, and to achieve almost perfectly elastic behavior in the torsional springs on which the mass quadrupoles are mounted. Van Kann and Buckingham described one such OQR gravity gradiometer in U.S. Pat. No. 5,668,315. Another version is first described in E. R. Canavan, M. V. Moody, H. J. Paik, R. V. Duncan, and J. A. Demko "Superconducting Gravity Gradiometer for Airborne Survey," presented at the American Geophysical Union Fall Meeting (San Francisco, December, 1995), and further detailed in Moody, M. V. and Paik, H. J., "A superconducting gravity gradiometer for inertial navigation", in Proc. IEEE 2004 Position Location and Navigation Symposium (PLANS 2004), April 2004, pp. 775-781. Still, another version is described in French, J. B. et al., U.S. Pat. No. 7,360,419. At temperatures significantly above cryogenic temperatures, including standard room temperature, all polycrystalline materials exhibit creep and hysteresis effects which degrade instrument response repeatability (which is, for example, why some high quality gravity meters are constructed of amorphous fused quartz, which exhibits much lower creep and hysteresis).

Current non-rotating OQR-type gravity gradiometers join their balance beams to their housings using springs which are in the form of a "microscopically" thick web. Being very thin, such a web will have a small cross-sectional area, resulting in large stresses in the web material in response to housing accelerations; hence such webs are fragile and are prone to breaking. It has proven difficult to achieve requisite dimensional tolerances when manufacturing that type of web flexure. Importantly, a web, when stressed by accelerations of the moving aircraft or vehicle, will undergo anisoelastic deformation (as described below), leading to undesirable nonlinear errors (sometimes referred to as noise) being imposed on the gradiometer signal.

SUMMARY

According to one aspect, a quadrupole responder for an OQR-type gravity gradiometer is provided. The quadrupole responder comprises a housing, and a mass quadrupole positioned within the housing. The mass quadrupole has a pair of sides, and also has a center of mass between the sides. At least a pair of torsion spring flexures are provided by pins connecting each of the sides of the mass quadrupole to the housing. The torsion spring flexures provide an axis of rotation which passes through the center of mass of the mass quadrupole and through both torsion spring flexures. The pins are integral with the mass quadrupole.

The quadrupole responder may further comprise a pair of bosses. Each boss may be integral with and coaxial with one of the pins. Each boss may be located outwardly of one of the pins. Each pin may have a first thickness, and each boss may have a second thickness. The second thickness may be greater than said first thickness.

The pins may be fixedly connected to the housing by the bosses. The bosses may be bonded to said housing. The bosses may be diffusion bonded to the housing.

Each of the pins has a cross-section at every point along a portion of the axis of rotation within each pin. A pair of orthogonal axes may be defined within said cross-section. The pair of orthogonal axes may intersect with and be orthogonal to the axis of rotation. The second moments of area about each of said orthogonal axes of the cross-section may be equal. In some embodiments, the pins and the bosses may be of circular cross-section. In such embodiments, the first thickness may be a first diameter and the second thickness may be a second diameter. Alternately, at least the pins or the bosses may be of square or octagonal cross-section.

The housing may have two halves. Each half may contain at least one V-shaped notch. The mass quadrupole may be located between said halves, with each of the bosses projecting into and bonded to each of said halves. The notches from each half of the housing together may form a clamp around one of the bosses. The bosses may be diffusion bonded to the housing at the notches.

The housing may be integral with the mass quadrupole and the pins.

The housing, the pins, and the mass quadruopole may be fabricated from niobium.

The housing may comprise side faces, and the pins may be positioned orthogonally to the side faces. The housing may define a volume in which the mass quadrupole is received, and the volume may have substantially the same shape as the mass quadrupole. The volume may define a gap between the mass quadrupole and the housing. The pins may be adapted to permit the mass quadrupole to move rotationally about the axis within the gap. The quadrupole responder may further comprise at least one sensor mounted in the housing and configured to detect a change in distance between the mass quadrupole and the housing. The at least one sensor may be mounted in a pocket adjacent the gap.

The torsion spring flexures may provide a combined torsional stiffness about the axis which results in a desired resonant frequency for rotational motion of the mass quadrupole about the axis with respect to the housing. The pins may also provide additional resonant frequencies for motions of the mass quadrupole in other rotational and translational modes. The first resonant frequency will preferably be lower than said additional resonant frequencies.

According to another aspect, a method of making a quadrupole responder for an OQR-type gravity gradiometer is provided. The responder includes a housing, and a mass quadrupole positioned within the housing. The mass quadrupole has a pair of sides, and also has a center of mass between the sides. At least a pair of torsion spring flexures are provided by pins connecting each of the sides of the mass quadrupole to the housing. The torsion spring flexures provide an axis of rotation which passes through the center of mass of the mass quadrupole and through both torsion spring flexures. The responder further includes a pair of bosses. Each boss is integral with and coaxial with one of the pins, and each boss is located outwardly of one of the pins. The method comprises (a) providing the housing in at least two parts, (b) assembling the parts of the housing with the mass quadrupole and clamping the bosses between the at least two parts of the housing, and (c) bonding the bosses with the assembled housing parts.

The parts of the housing may include top and bottom parts. Each may have at least one V-shaped notch therein. The V-shaped notches together may be adapted to clamp the bosses to the housing when the housing parts are assembled with the mass quadrupole.

Each of the two housing parts may include a half hole. At least one of the half holes may have a combination of radial outward cut or cuts connected to annular cuts so that an appropriate clamping pressure is exerted on the bosses when the housing parts are assembled with the mass quadrople. The half holes may have at least some dimensions smaller than those of the bosses to provide an interference fit, thereby providing appropriate clamping pressure.

The method may further include a step of forming an opening in at least one housing part adjacent the half-hole therein, to provide flexibility at the surface of the half-hole and thus to improve the uniformity of application of clamping pressure. The opening may include an annular slot.

The bonding may be performed by diffusion bonding.

According to another aspect, a method of forming a quadrupole responder for an OQR-type gravity gradiometer is provided. The quadrupole responder comprises a housing, and a mass quadrupole positioned within the housing. The mass quadrupole has a pair of sides, and also has a center of mass between the sides. At least a pair of torsion spring flexures are provided by pins connecting each of the sides of said the mass quadrupole to the housing. The torsion spring flexures provide an axis of rotation which passes through the center of mass of the mass quadrupole and through both spring flexures. The method comprises selecting a monoblock of a material, and then cutting the monoblock to form the housing, the mass quadrupole and the spring flexures as a single integral structure.

The cutting may be performed by electrostatic discharge machining. The cutting may include milling. The cutting and milling may release successive faces of the mass quadrupole from the monoblock.

The torsion spring flexures may provide a combined torsional stiffness which results in a desired resonant frequency for rotational motion about the axis of the mass quadrupole with respect to the housing.

The monoblock may be selected from one of a homogeneous and a heterogeneous composition. The monoblock may be homogeneous and comprise niobium. The monoblock may be heterogeneous and comprise niobium and titanium. Alternately, the monoblock may be made from another suitable material.

The method may further comprise forming one or more pockets in the housing adjacent the mass quadrupole, and inserting sensors into the one or more pockets.

BRIEF DESCRIPTION OF THE DRAWINGS

Reference is made in the detailed description to the accompanying drawings. In the drawings:

FIG. 7 is a side view showing another approach to manufacturing a quadrupole responder;

FIG. 8 is a partly exploded end view of the quadrupole responder of FIG. 7;

DETAILED DESCRIPTION

Figure 1:
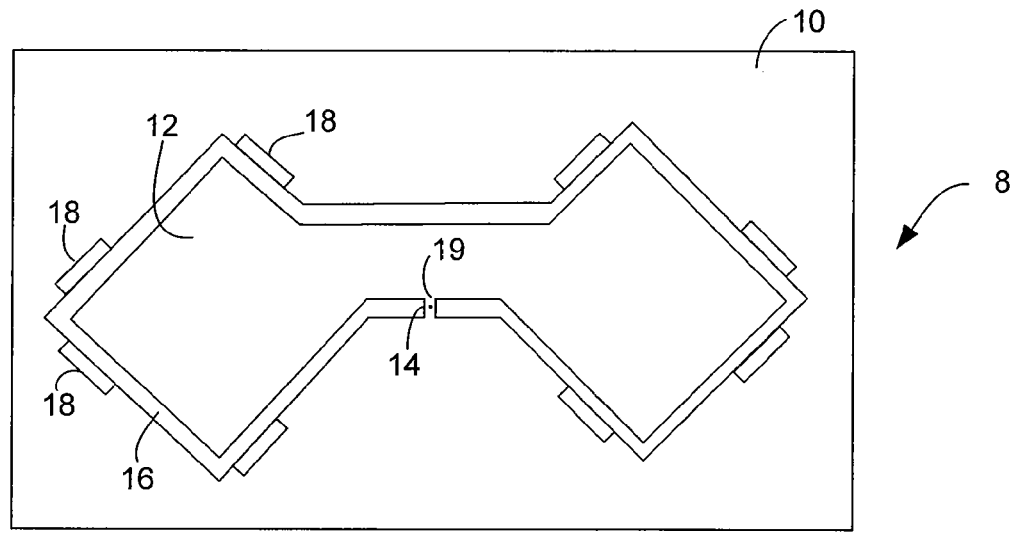
FIG. 1 is a diagram of a conventional prior art OQR-type gravity gradiometer mass quadrupole, housing and flexure.

Reference is first made to FIG. 1 which shows diagrammatically a side view of a prior art quadrupole responder 8 (as shown in U.S. Pat. No. 7,360,419 to French et al., and in published U.S. Patent Application No. US2006/0207326 A1). It is essentially a two-dimensional slab comprised of a housing 10, a mass quadrupole 12 (a balance beam), and a web flexure 14 which joins the mass quadrupole 12 to the housing 10. The whole assembly can be conveniently cut from one slab by electrical discharge machining (EDM) a gap 16 completely around the quadrupole responder 12 except for the thin web of material left to form the flexure 14. When the mass quadrupole or balance beam 12 rotates slightly in the gap 16 about the axis of rotation 19 in response to a changing gravity gradient, the motion is detected by sensors located in pockets 18 which are also cut out from the original slab. Each sensor is located in a position such that as the balance beam rotates around the flexure axis 19, the distance which is the width of the gap between the sensor and a face of the balance beam changes. Sensors are chosen which produce outputs which vary as this gap distance changes, thus measuring the rotation angle of the balance beam with respect to the housing. While in principle as few as one such sensor could suffice for making this measurement, additional sensors can be employed to produce advantages such as reducing sensitivity to thermal expansion and to motions of the balance beam in other directions, and (in the case of a superconducting balance beam and inductive-coil sensors) allowing the balance beam's resonant frequency about the flexure axis 19 to be tuned, and its rotational motion to be electrically subtracted from that of the other quadrupole responder in an OQR gravity gradiometer in order to measure differential-mode motion with maximum sensitivity and stability, as described in U.S. Patent Application No. US2006/0207326 A1. Thus multiple sensor pockets (in this case eight) are shown in FIG. 1.

The shape of the mass quadrupole is designed so that its center of mass is located as closely as possible to the axis of rotation 19 defined by the center of the web flexure 14. Two such quadrupole responder assemblies arrayed orthogonally to each other with their rotational axes co-linear form a gravity gradiometer in the form of an orthogonal quadrupole responder, or OQR (as also shown in the above patent to French et al.).

Figure 3A:
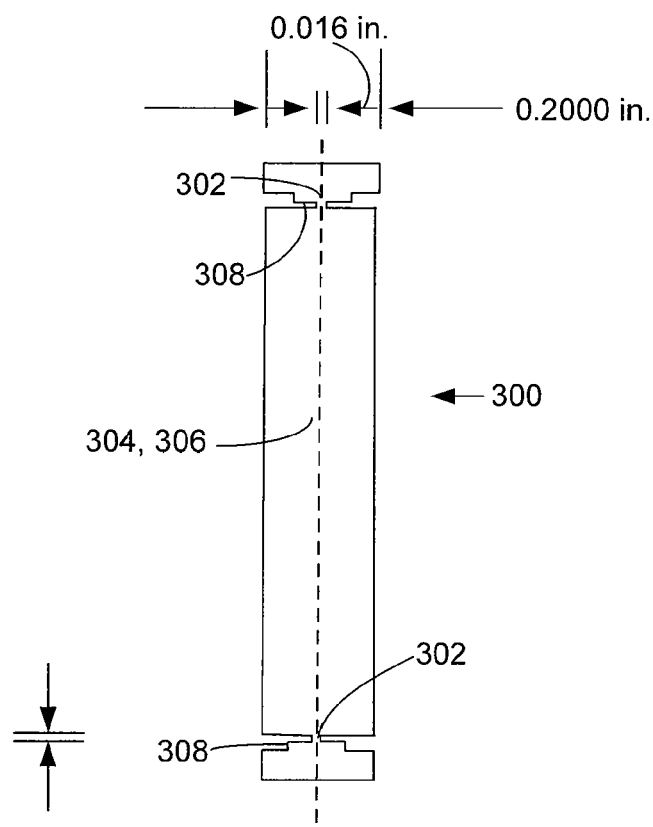
FIG. 3A is a side view of pins for the quadrupole responder of FIGS. 2 and 3 machined from and being part of a single rod.
Figure 2:
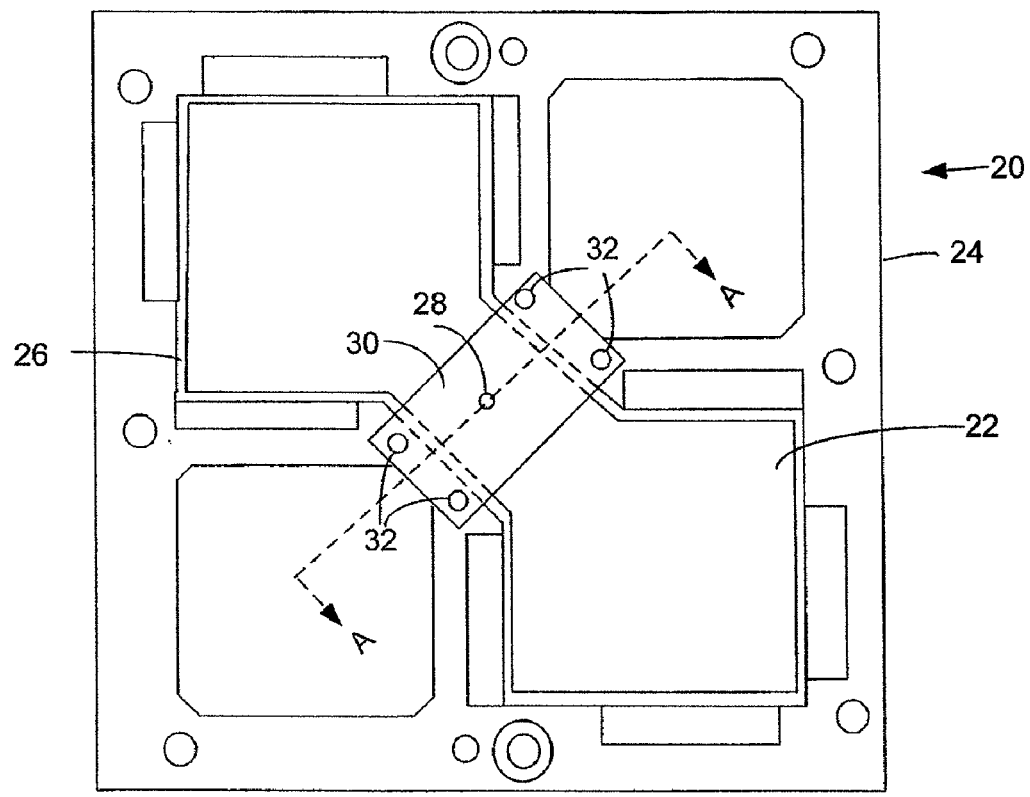
FIG. 2 is a side view of a first embodiment of a quadrupole responder.
Figure 3:
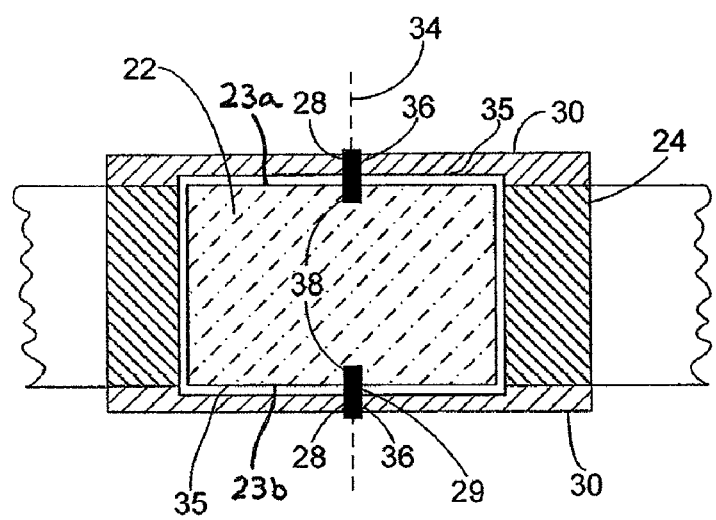
FIG. 3 is a sectional view taken along lines A-A of FIG. 2.

Reference is next made to FIGS. 2 and 3, which show a first embodiment of a quadrupole responder 20. As in the prior art, the quadrupole responder 20 includes a balance beam or mass quadrupole 22 having a pair of preferably planar opposing quadrupole faces 23a, 23b oriented in parallel relation to each other. The mass quadrupole 22 is surrounded by a housing 24, with capability of rotating slightly in the gap 26. However, the balance beam 22 is connected to the housing 24 not by a web but by two trunnion pins 28 (FIGS. 2, 3) extending from the opposing quadrupole faces 23a, 23b. The pins 28 are mounted in side-plates 30 which are fastened to the housing 24 by bolts 32. As used herein, the term 'pin' includes any structure which may connect the balance beam 22 to the housing 24, and that includes at least a portion that may act as a torsion spring (also called torsion flexures, flexure regions, or torsion spring flexures). That is, the pins provide the torsion spring flexures. In the present embodiment, the pins 28 connect the balance beam 22 to the housing 24 indirectly, via the side plates 30. However, in alternate embodiments, the pins 28 may connect the balance beam 22 to the housing 24 directly. Further, in the present embodiment, only a portion of each of the pins 28 acts as a torsion spring. Specifically, the portions 29 of the pins 28 which bridge the gaps between the balance beam 22 and the side plates 30 act as torsion springs. The axis of rotation 34, defined by a longitudinal axis of the two pins 28, such as the center-line of the two pins 28, is located, preferably precisely located, to pass through the center of mass of the mass quadrupole 22 and to be orthogonal to the plane of the side faces 35 of housing 24 and the opposing quadrupole faces 23a, 23b. The foregoing configuration permits two such assemblies to conveniently be assembled with their axes precisely aligned to be co-linear with the long axes of the mass quadrupoles 22 oriented at 90° to each other to form a complete OQR-type gradiometer.

In FIGS. 2 and 3, the side plates 30 are drawn as bridging just the area near the pins 28, but it will be evident that they can be enlarged so that when the assembly is completed, they serve both to locate the pins 28 and to act as shear webs providing additional stiffness to the entire housing 24.

For assembly, the balance beam 22 may be positioned accurately in the housing 24 by leaving a bridge between the beam and the housing that is removed at the end of the fabrication process. Alternatively temporary assembly shims and clamps (not shown) can be employed. The side plates 30 are fastened in place prior to drilling and pin insertion so that accurate alignment can be achieved between the holes 36 which are drilled in the side plates 30, and the holes 38 which are drilled in the balance beam. The hole diameters are such that a forced fit is achieved when the pins 28 are driven into place through the holes 36 in the side plates and into the holes 38 in the balance beam.

Alternatively, to avoid requiring a force fit, the pins can be formed from a long, large-diameter rod 300 (FIG. 3A), by machining that rod (e.g. using a lathe) to remove material in two sections of that rod, to form the two torsion spring flexures (shown at 302 in FIG. 3A), such that the center-lines 304 of the torsion spring flexures are collinear with the center-line 306 of the rod, and so that the two torsion spring flexures 302 are the desired distance apart from each other. As an example, FIG. 3A shows such a rod 300 of diameter 0.2 inch, with two torsion spring flexures 302 of diameter 0.016 inch and length 0.010 inch machined into it, along with two intermediate-diameter bosses 308 which are machined from the rod 300 just outboard of the torsion spring flexures 302. In this embodiment, the entire portion of each pin comprises the torsion spring flexure, and both the pin and the torsion spring flexure are defined by the region bridging the gaps between the balance beam 22 and the side plates 30. In order to receive the rod 300 and pins 302 of this alternative embodiment, a bore (not shown) may be made through the entire thickness of the balance beam 22. Insertion of the pins into the balance beam 22 and the housing 24 of FIG. 3 can be achieved by heating the balance beam and housing assembly and/or cooling the pin component (rod 300 after machining it) to attain sufficient clearance from thermal expansion/contraction. This can be followed by immediately inserting the rod 300 into each of the three holes in turn (one hole in the balance beam 22 and one hole in each side of the housing 24), and holding it in place while and until the parts come to the same temperature. As an example the pin component, fabricated from 0.2 inch diameter Ti alloy rod, can be cooled to $-196°$ C., and a niobium housing and balance beam is warmed to 300° C., to achieve a 0.0005 inch clearance between the rod and the holes for insertion, which would result in a 0.00025 inch interference fit upon all of the parts returning to the same temperature.

A gravity gradiometer may typically require that the balance beam of a quadrupole responder repeatably rotate relative to the housing by an angle of approximately $10^{-12}$ radians, equivalently repeatably changing the size of the gap between the face of a sensor (located in one of the pockets 18 in FIG. 1) and the adjacent face of the balance beam by $10^{-13}$ m, in response to a 1 E change in gravity gradient. Achieving this level of repeatability can be very difficult with multi-component assemblies. This is because hysteresis and creep effects due to stress relief at the joints of the assembly can induce dimensional changes corresponding to unacceptably large instrument measurement drift, especially when subjected to unavoidable vibrations in mobile use.

To avoid this problem, it has been found that, if the mating faces in the assembly are properly prepared and are under sufficient compression (provided for example by the force fit of the pins 28 in the side plates 30 and in the balance beam 22, or by the interference fit described above), and the whole assembly is then subjected to a suitably high temperature of, for example 1100° C. in vacuum, that a combination of annealing and diffusion bonding will occur such that the whole assembly effectively becomes a stress-relieved monoblock entity. This may involve a multi-step process.

Exemplary dimensions and resulting dynamic and static properties are as shown in the following two tables. The formulas indicated make use of simple beam theory to estimate, to a first approximation, the stiffness of the flexure in various rotational and translational directions. While a more-detailed analysis (e.g., using finite element modeling) accounting for the effects of the short height of the torsion pins would be needed to determine higher-accuracy estimates for these, these simple-beam-theory estimates serve to confirm that this design approach produces adequate stiffness in all directions, without experiencing excessive stress when the balance beam is rotated through a significantly large angle about the flexure axis.

TABLE 1

Two Pin Pivot
(fundamental modes)

Balance Beam (coordinate system is aligned with principal moments)

Mass (M): 0.691 kg pure niobium (same as housing)
Moments of inertia (kg cm$^2$): $J_{zz} = 7.07$, $J_{yy} = 6.56$, $J_{xx} = 1.18$
Thickness (b): 2.41 cm
Pin dimensions:

Diameter (d): 0.40 mm
Exposed length (h): 0.25 mm
Material- Ti—6Al—2Sn—4Zr—6Mo
shear modulus (G): 43 GPa
elastic modulus (E): 114 GPa
shear strength: 660 MPa
shear coefficient (ξ): 1.07
Fundamental mode $$K_z = \frac{\pi d^4 G}{32\, h} = 0.432 \text{ Nm,}$$

$$f_z = \frac{1}{2\pi}\sqrt{2k_z/J_z} = 5.6 \text{ Hz}$$

Deformation is limited to 0.0015 radians by motion limiter stops (not shown in FIG. 2)

$$\sigma = \frac{16 k_z \theta_z}{\pi d^3} = 5.16 \times 10^7 \text{ Pa}$$

TABLE 2

Two Pin Pivot
(other modes)

Translational modes $$k'_{x,y} = \frac{3\partial d^6 EG}{4h(4h^2 G + 3\xi d^2 E)} = 1.71 \times 10^7 \text{ Nm}^{-1},$$

$$f'_{x,y} = \frac{1}{2\pi}\sqrt{k'_{x,y}/M} = 1119 \text{ Hz}$$

$$k'_z = \frac{\partial d^2 E}{2h} = 5.73 \times 10^7 \text{ Nm}^{-1},$$

$$f'_z = \frac{1}{2\pi}\sqrt{k'_z/M} = 2050 \text{ Hz}$$

TABLE 2-continued

Two Pin Pivot
(other modes)

Orthogonal rotational modes $k_{x,y} = k'_{x,y}(b/2) = 2.48 \times 10^3$ Nm, $f_x = \frac{1}{2\pi}\sqrt{2k_{x,y}/J_x} = 1031$ Hz $f_y = \frac{1}{2\pi}\sqrt{2k_{x,y}/J_y} = 450$ Hz These dimensions and properties are compatible with a cryogenic gravity gradiometer suitable for mobile geophysical surveying applications. Cryogenic temperatures permit the superconducting properties of niobium to be exploited, through the use of the Meissner effect of the mass quadrupole's material to couple the inductance of sensing coils to motions of the mass quadrupole, through the use of inductive sensors using SQUIDs (Superconducting Quantum Interference Devices) to measure those inductances with very low noise, through the use of a superconducting enclosure to exclude the currents which would otherwise be produced by the earth's magnetic field, and to reduce the effects of Brownian motion to an acceptable level. It will be realized, however, that the advantages of the arrangement described below will also be obtained in other gradiometer designs, such as one designed to operate at room temperature.

In an example, a high strength titanium alloy is chosen for the pins 28, because it provides extra strength and has been successfully diffusion bonded to niobium in a prior art gravity gradiometer based on a web type flexure made of this alloy. However, other alloys with suitable properties can be used, as could pure metals such as niobium.

It may be highly beneficial in terms of the ultimate signal-to-noise ratio to have a suspension (i.e. the torsion springs) which is relatively flexible in the signal mode (corresponding to a relatively lower resonant frequency for motion of the mass quadrupole relative to the housing about the flexure axis) but relatively stiff in all other modes (corresponding to higher resonant frequencies, and hence smaller deflections and noise corresponding to these undesirable motions, for motions of the mass quadrupole relative to the housing in all other rotational and translational directions). Sources of noise resulting from these other modes can be translational accelerations, rotational accelerations or rotational velocities of the housing about axes other than the flexure axis, or can be higher order effects resulting from combinations of these motions. The resulting advantages of this arrangement over prior art are as follows.

First, the translational acceleration response mode frequencies are high (estimated in the example at over 1100 Hz), compared to the signal mode at 5.6 Hz. This reduces the noise resulting from the associated center-of-mass shift effects.

Figure 15A:
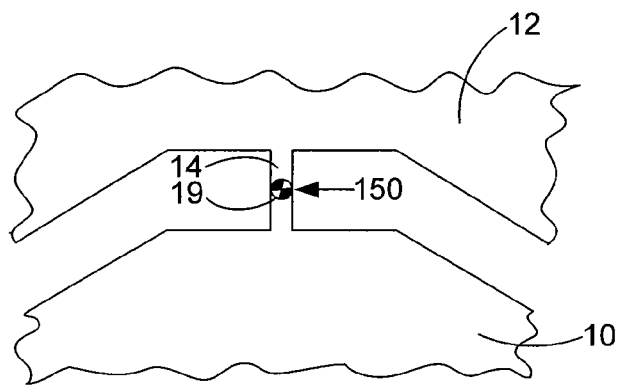
FIG. 15A is an enlarged view of the flexure region for a prior art quadrupole responder of the kind shown in FIG. 1.
Figure 15B:
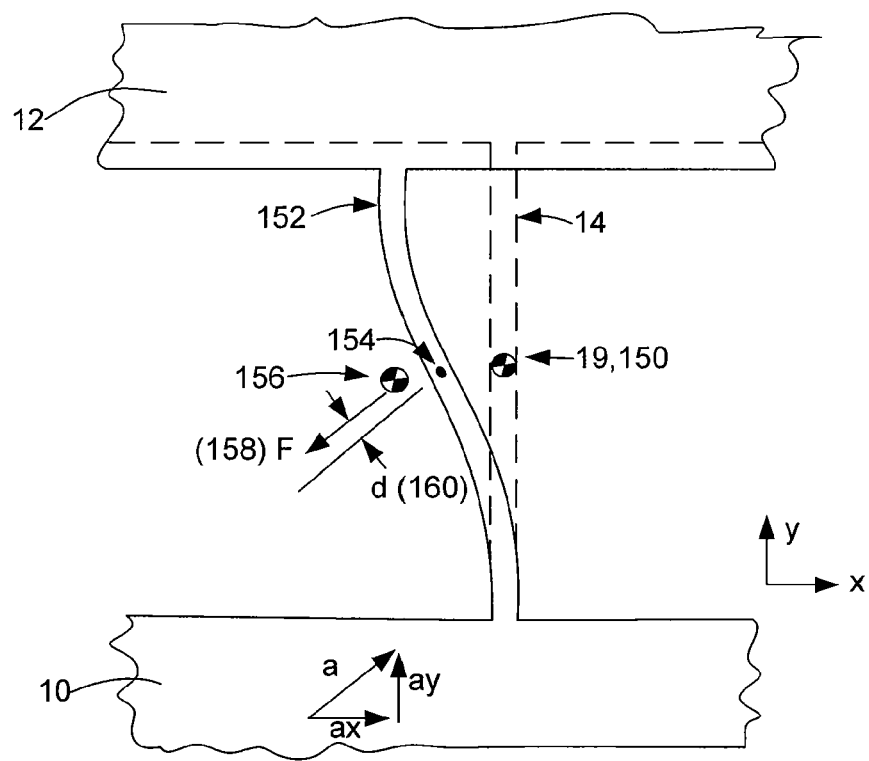
FIG. 15B is an enlarged view of the flexure region shown in FIG. 15A, and showing the effects of an acceleration.

Second, a dominant source of error when a web geometry is used (as shown in FIG. 1) is the so-called "induced dipole" effect, as illustrated in FIGS. 15A and 15B. FIG. 15A is a close-up diagram of the flexure region of the type of prior art quadrupole responder shown in FIG. 1 (note, however, that the gap and flexure dimensions in this diagram are not to scale, but are exaggerated for clarity). In FIG. 15A, the housing 10, balance beam 12 and web flexure 14 are shown in their nominal, as-machined positions and shapes. The axis of flexure 19 is located along the center-line of the flexure. The balance beam has been machined and trimmed so that its mass center 150 is (as nearly as possible) located on the axis of flexure 19.

FIG. 15B is a diagram of the same flexure region, for the case when the housing is accelerating with an exemplary acceleration vector "a", which has vector components $a_x$ and $a_y$ as shown. The web flexure, being made of an elastic material, will deform in both the x and y directions, due to the pseudo-force F 158 (proportional and opposite in direction to acceleration vector "a") arising from the inertial resistance of the balance beam to the acceleration components $a_x$ and $a_y$. The undeformed web shape is shown using dashed lines 14, and the deformed web shape is shown using solid lines 152 (the web deflection is shown grossly exaggerated for clarity of illustration). The deformed location of the center of flexure 154 is located in the center of the deformed flexure. The deformed location of the center of mass 156 remains in the same fixed position relative to the deformed balance beam as in FIG. 15A. Both are displaced in the x and y directions from their undeformed positions; for this type of web flexure, it is known that the amount by which the mass center 156 moves in both the x and y directions is approximately twice the amount that the center of flexure 154 moves in each of those directions, thus they are not coincident. For realistic prior art gravity gradiometer designs, it is also known (e.g. as discussed in detail in Section 4.2.1.2 of [Matthews, Robert, "Mobile Gravity Gradiometry", Ph.D. thesis, Dept. of Physics, University of Western Australia, Perth, 2002]) that the flexure is much stiffer in the y direction than in the x direction in response to such housing accelerations; thus for example when $a_x$ and $a_y$ are equal in magnitude, which is the case shown in FIG. 15B, the displacement of the mass center 156 from its original location 150 in the y direction is much smaller than its displacement in the x direction, and similarly for the displacement of the center of flexure 154. As a result, the line of action of the pseudo-force F 158, which passes through the balance-beam's mass center 156, will pass a distance d 160 from the deformed center of flexure 154. (While this has been illustrated for the case where $a_x=a_y$, a similar result holds for all acceleration vector directions and magnitudes, including those where $a_x$ and $a_y$ are not equal, except for those cases where $a_x=0$ or $a_y=0$.)

If the mass of the balance beam is denoted as m, then the quantity d*m is known as the induced dipole, that is, the mass dipole with respect to the center of flexure that is induced by the acceleration of the housing. This induces a torque on the balance beam of magnitude d*m*a=d*F, which is known as the induced dipole moment. It can be shown that the induced dipole moment is proportional to the product of the two accelerations $a_x*a_y$, and hence this torque, and the resulting balance-beam rotational motion, is nonlinear in $a_x$ and $a_y$. This results in a nonlinear error or noise term in the output of a gravity gradiometer using such a web flexure. For prior art gravity gradiometer designs, the magnitude of this induced dipole moment error is significantly large, and limits the signal-to-noise performance achievable by such instruments in applications such as airborne surveying, in which such accelerations are continually present.

This effect occurs fundamentally because the web-type torsional flexure is anisoelastic with respect to translational accelerations. That is, the web type of flexure has greater stiffness against the inertial force caused by acceleration of the housing in one direction $a_y$, than it has against the force due to acceleration in a perpendicular direction $a_x$. Anisoelasticity is a property that also is known to degrade the performance of other types of inertial-sensing instruments; as described in Chapter 2, equation 2.4 of [Lawrence, Anthony, "Modern Inertial Technology", $2^{nd}$ edition, Springer, New York, 1992]. Anisoelasticity in the supports of the sensing element in mechanical gyros is known to produce a similar nonlinear error in these instruments. Such nonlinear errors are particularly troublesome, because they cannot be removed using standard linear signal filtering techniques, and because through the effect known as intermodulation they can rectify otherwise unimportant high-frequency errors to result in significant low-frequency errors.

In contrast, the quadrupole responder of FIG. 2 provides an isoelastic flexure connecting the balance beam to the housing of a quadrupole responder. As a consequence the nonlinear induced dipole error or noise source can ideally be eliminated (in practice, manufacturing tolerances may result in a residual amount of anisoelasticity, which however can be much smaller than the amount inherent in the web-type flexure). The isoelasticity of the two pin flexure arises from the symmetry of the stiffness of the two pins when loaded by the inertial response of the balance beam to sideways (perpendicular to the flexure axis) accelerations $a_x$ and $a_y$ of the housing, as compared to the asymmetric stiffness when a web flexure is similarly loaded. As a consequence, the requirement to isolate the instrument from translational accelerations (or the equivalent need to post-process the raw data using measurements of these accelerations and subtracting out the calibrated instrument responses) can be greatly reduced. Since this embodiment will commonly be carried in an aircraft (for airborne surveys) and since it is difficult and expensive to provide isolation from the translational accelerations of the aircraft induced by turbulence (particularly for the large amplitude excursions resulting from low frequency turbulence), this embodiment provides the potential for a greatly improved signal-to-noise ratio performance at significantly reduced difficulty and expense.

It may be advantageous to provide motion-limiting stops, also known as end-stops (not shown in FIG. 2), to limit rotational motion of the balance beam about the flexure axis to be no larger than a small angle, e.g. 0.0015 radians, so as not to approach the elastic limit of the complete torsional flexure, and so as the balance beam does not collide with the gap-measuring sensors in pockets 18. This limit is far greater than the motion corresponding to the required signal range for gravity gradients plus unwanted rotational accelerations to which the instrument may be subjected.

Achieving these benefits for the method of manufacture described above may be dependent on success in obtaining a high quality bond (such as a diffusion bond) between the pins 28 and the surfaces of the holes 36, 38 in both the balance beam 22 and housing side plates 30 into which the pins 28 are force fitted. When subjected to torsional loading, stress is highest at the outer diameter (assuming circular cross-section) of the pins 28 and this stress is transmitted as high shear stress through the diffusion bonds.

Figures 4, 5:
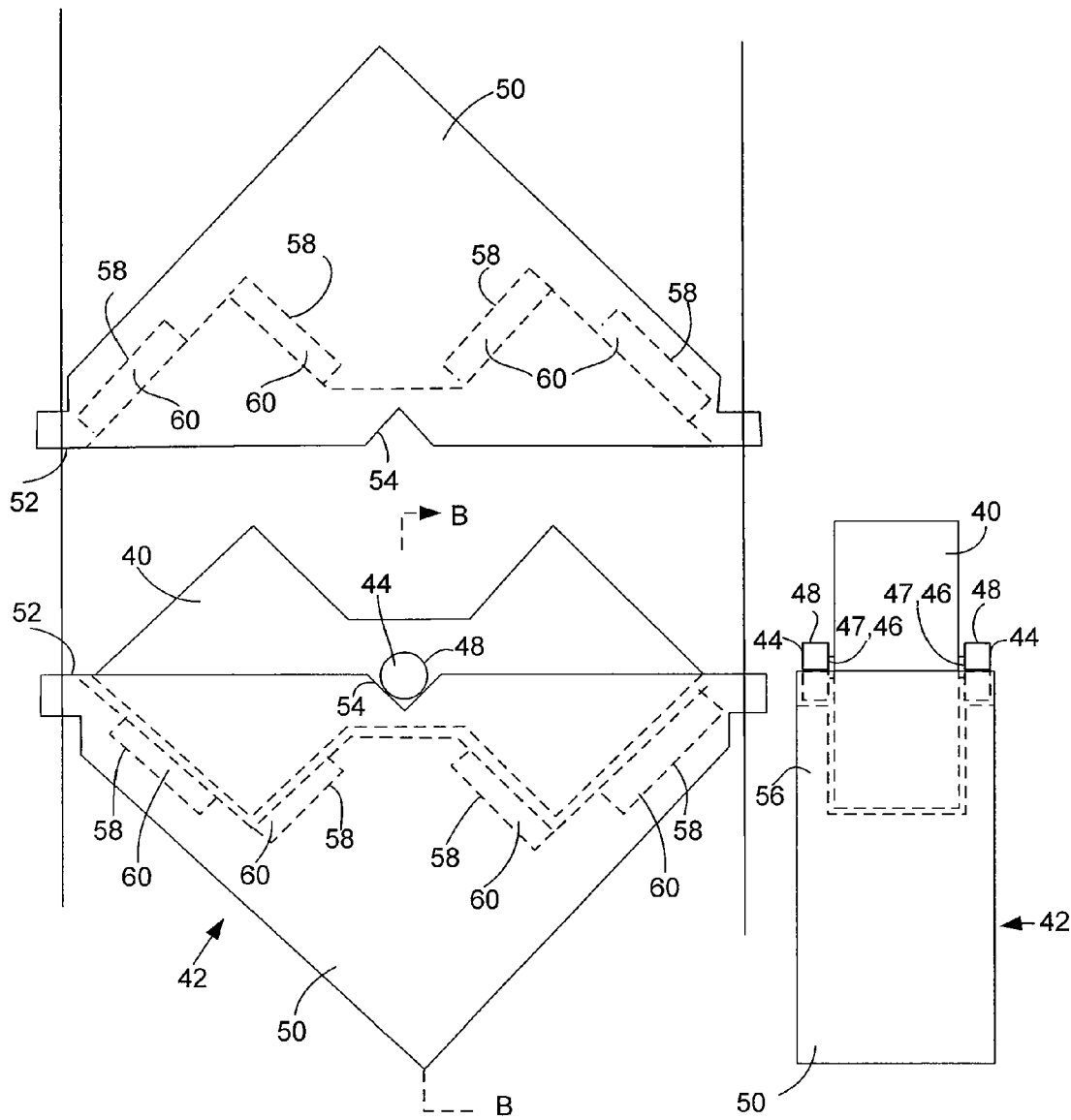
FIG. 4 is an exploded side view of another embodiment of a quadrupole responder.
FIG. 5 is a side view of the mass quadrupole, pins and lower portion of the housing of FIG. 4.

In FIGS. 4 and 7 a bowtie shape for the balance beam has been illustrated only for consistency with the figures in the related applications discussed below and above. This shape originated from the requirement of the prior art web flexure design to locate the web at the centre-of-mass of the beam, plus a desirable design feature achieved by reducing the thickness of the central region of the balance beam so that bending of the balance beam could compensate for the induced-dipole effect that is illustrated in FIG. 15. This bowtie shape and its accompanying design features, however, are not required in the present application. For example, the central region can be made thicker to reduce the bending of the balance beam.

Two alternative methods of manufacture will now be described.

In one alternative method of manufacture according to the present application, shown in FIGS. 4 to 8, the balance beam 40 and housing halves 50 are first machined from three separate pieces. The balance beam 40 is first machined, so as to provide two integral protruding cylindrical portions, one on each face of the balance beam 40. The balance beam 40 (including the cylindrical portions) is then annealed, and then pins 47 are formed in the cylindrical portions by machining, down to a thickness and a length that will result in the desired flexure properties. Accordingly, in this embodiment, the entire portion of each pin 47 comprises the flexure region 46, and both the pins 47 and the flexure regions 46 are defined by the region bridging the gaps between the balance beam 40 and the housing halves 50. After machining of the cylindrical portions, bosses 44 are formed. The bosses 44 are coaxial with and fixedly connected to (i.e. integral with) the pins 47, and each boss is located outwardly of one of the pins. The bosses 44 have a thickness is greater than the thickness of the pins 47. In embodiments where the flexure regions 46 are circular in cross section, the thickness may also be referred to as a diameter. For example, the flexure regions 46 may have the same finished thickness and length as those of the previously described torsional flexure regions, namely 0.40 mm diameter and 0.25 mm length. Flexure regions 46 in the embodiment shown are of circular cross-section. The dimensions of the bosses 44 can be varied, but one order of magnitude larger (4 mm by 2.5 mm) than the flexure regions 46 will achieve substantial advantages. As before, the rotational axis of the final assembly will be defined by the alignment of the two torsional flexure regions 46 so that such axis passes as closely as possible through the center of mass of the balance beam 40 and is orthogonal to the side surfaces of the balance beam 40. The finished outer cylindrical portions 48 of the bosses 44 are also concentric with this axis. Note that none of the bosses 44, the flexure regions 46, and the outer portions 48 of the bosses, need to be cylindrical. They can have any desired cross-section (subject to the considerations discussed later for the cross-sections of the flexure regions 46).

The housing 42 is formed (as previously indicated) from the two separately machined halves 50 shown in FIGS. 4 and 5, which are subsequently joined (e.g. by bolts, not shown) along two ground and polished surfaces 52 to permit a high quality diffusion bond. Two precision V-notch grooves 54 are machined in these surfaces to form a two-jaw chuck or clamp when assembled around the outer portions 48 of the bosses 44 of the balance beam 40. A slight over-sizing of the diameter of the bosses 44 relative to the faces of the grooves 54 (which form the clamp) is chosen to provide the high contact pressure necessary to achieve consistent, high quality diffusion bonding at a suitably high temperature, for example 1100° C. The side plates 56 in which the V-notch grooves 54 are located are integral with their respective housing halves 50 and can cover each entire side of the housing 42. FIG. 5 shows the structure partially assembled.

To ensure assembly, both the mating surface 52, and the clamping surfaces 54 are preferably under positive compression during assembly.

Figure 6:
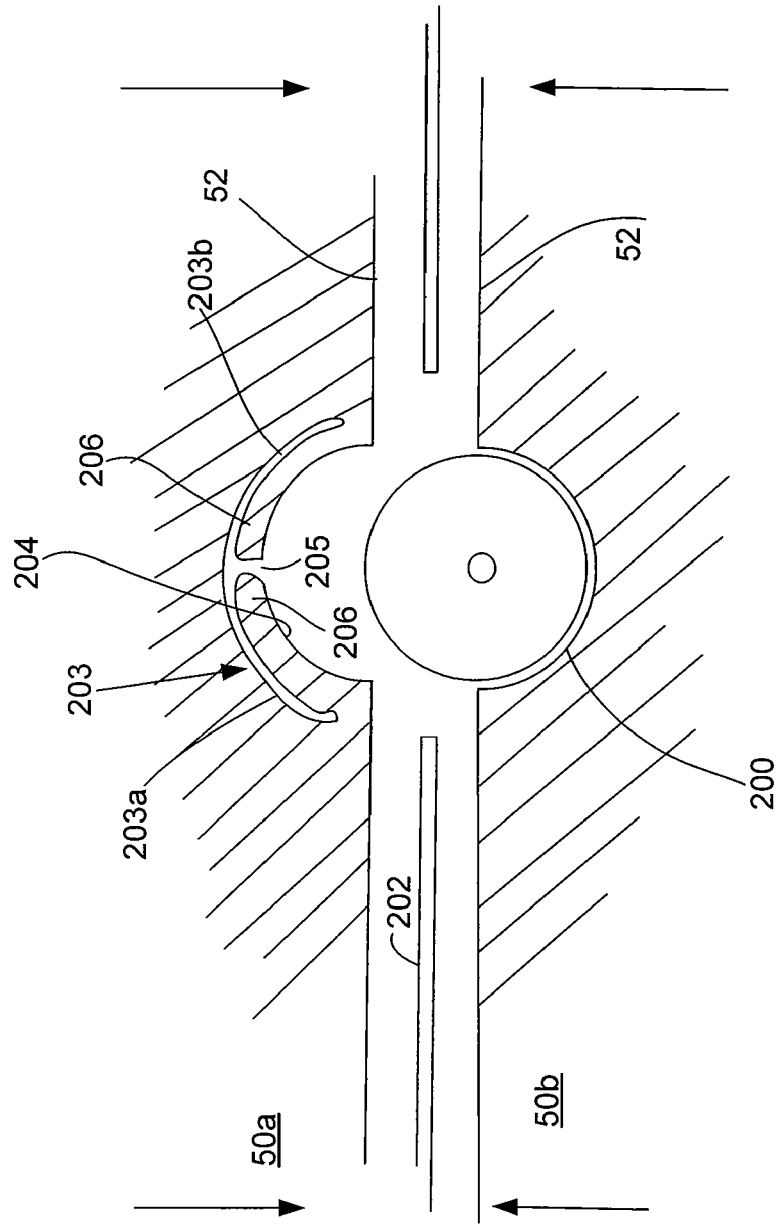
FIG. 6 is a magnified side view of an alternate approach to encastering a torsional flexure pin for the quadrupole responder of FIGS. 4 and 5.

Another exemplary method of achieving the desired positive compression will now be discussed with reference to FIG. 6. This method is intended to facilitate the application of appropriately high clamping pressure on the mating surfaces 52, and on the portions of the bosses 44 within the clamp surfaces 204. The pressure on bosses 44 is applied through clamping surfaces 204. However, it may be difficult to achieve this high clamping pressure simultaneously on both sets of components. In the approach illustrated in FIG. 6, a precision hole 200 is bored with the two housing halves 50a, 50b clamped together with a thin shim 202 between them. The housing halves 50a, 50b are then separated and the shim 202 is removed. EDM annular cuts 203 are then made in the upper housing half 50a typically in the form of a thin slot concentric with hole 200. Preferably the cut or slot 203 is divided into two parts 203a, 203b by another EDM cut 205, creating two tongues 206. Upon reassembly without the shim 202, an appropriately large compression force is achieved on mating surfaces 52, and on each of the two bosses 44 all simultaneously, to ensure diffusion bonding when heated. The cuts 203, 205, and the resultant tongues 206 provide radial flexibility of at least the upper clamping surface 204 at the bosses 44, to help provide strong clamping pressure simultaneously both throughout the clamp interface, and at mating surfaces 52.

The overall approach described with reference to FIGS. 4, 5, and 6 may provide several advantages. First, the extensive side plates 56 may greatly increase the rigidity of the whole housing assembly 42 by acting as shear webs to reduce the deformations which the housing 42 can undergo when subjected to acceleration forces transmitted through the mounting regions into the housing. Of course, cut-outs in the side plates 56 can be formed to lighten the structure, and are preferably in place (as indicated at 58) over the pockets 60 where the sensors (not shown) are inserted and mounted in the complete assembly. A separate machining of the balance beam 40 permits open access to the sensing surfaces of the beam for finishing processes and microscopic inspection for finish damage, and impurities, etc. which experience has shown can, at superconducting temperatures, lead to quantized flux jumps or flux creep which interfere with the SQUID method of position measurement. However, primarily because the pins 47 (which, in this embodiment, are equivalent to the flexure regions 46) are integral with the balance beam 40, when compared to the embodiment of FIGS. 2 and 3, this approach eliminates two of the four diffusion bonded encastering joints holding the torsional flexure, and may increase the bonding area of the other two joints by a factor of 100, and the moment arm for the shear torque at the joint in response to balance beam rotation about the flexure axis by a factor of 10, decreasing the shear stress at the joint in response to such a load by a factor of several hundred and commensurately reducing any creep propensity.

The same principle can be applied to other geometries, as shown for example in FIGS. 7 and 8. For the FIGS. 7 and 8 embodiment, the balance beam 70, bosses 72 and pins 73 are manufactured in one piece and mass trimmed to place the center of mass of the structure as closely as possible on the axis of rotation 75. Again, in this embodiment, the entire portion of each pin 73 comprises a flexure region 74, and both the pins 73 and the flexure regions 74 are defined by the region bridging the gaps between the balance beam 70 and the housing. The housing 76 is made in two separate pieces 78, 80. In this version the housing is split edgewise, as indicated in FIG. 8. Precision guide holes 81 and pins 82 located on the periphery of the housing pieces 78, 80 provide accurate alignment. Temporary guide holes and pins through the balance beam 70 can provide rotary positioning of the beam if necessary. Since preferably no axial clamping pressure on the boss-to-housing joints 84 is to be applied due to the delicacy of the flexures 74, eutectic soldering can be used here and on mating faces of the two housing holes 86, 88, after loose-fitting the bosses 72 into the housing holes 86, 88.

In the embodiments of FIGS. 4 to 8, the pins connect the balance beam to the housing indirectly, via the bosses.

In a second alternative method of manufacture, according to the present application, the necessity for mechanically assembling a quadrupole responder from separate parts may be entirely eliminated by forming the entire assembly—housing, balance beams and pins—from a single starting monoblock of material, using various machining operations. In this embodiment, similarly to the embodiments of FIGS. 4 to 8, the entire portion of each pin is a flexure region, and both the pins and the flexure regions are defined by the region bridging the gaps between the balance beam and the housing. In this approach, there are preferably no assembled mechanical joints between the balance beam, the flexure elements and the housing, thus largely eliminating the potential for hysteresis and creep in such joints. Here, the term "monoblock" means a mass of contiguous solid material with no mechanical joints. The mass could be homogeneous in composition (for example, a rectangular bar of pure niobium), or it could be heterogeneous in composition (for example, a rectangular bar of pure niobium into which a cylindrical rod of a titanium alloy, such as that specified for the pins in Table 1 (above), is inserted into a cylindrical hole bored in the niobium bar and then diffusion bonded and then annealed or is cast in place by pouring that titanium alloy in molten form into a cylindrical hole bored in the niobium bar and then allowed to solidify).

An example of the fabrication process used in this approach will now be described. This process begins by forming a monoblock of a suitable material into a suitable initial shape, through any convenient machining means (e.g. milling). In order for a material to be suitable, it preferably possesses material properties compatible with the resulting quadrupole responder achieving adequate performance. For example, it is preferably strong enough for the torsion pins to be able to support the balance beam against the expected load environment without yielding or breaking. Its modulus of elasticity is preferably within a range to produce a torsional stiffness in those torsion pins, such that the resulting rotational resonant frequency (which also depends on the material's density) is within the range desired for the gravity gradiometer application. Its stiffness is preferably also high enough so that the deformation of the housing and balance beam are sufficiently low as to not unacceptably degrade the performance of the gravity gradiometer. Several related properties variously known as internal friction, viscoelasticity and quality factor (cf. R. S. Lakes, "Viscoelastic Measurement Techniques," Review of Scientific Instruments, Vol. 75, No. 4, April 2004, pp. 797-810) are preferably also such that hysteresis and creep within the torsion pins is low enough to allow the quadrupole responder to achieve adequate performance, e.g. in terms of bias drift. An initial monoblock shape is suitable if it is compatible with the desired final shape for the housing and the balance beam, as well as with the execution of a series of machining operations to release the balance beam from the solid block, e.g. the block should be shaped to allow it to be securely clamped during each of the machining operations.

Figure 9A:
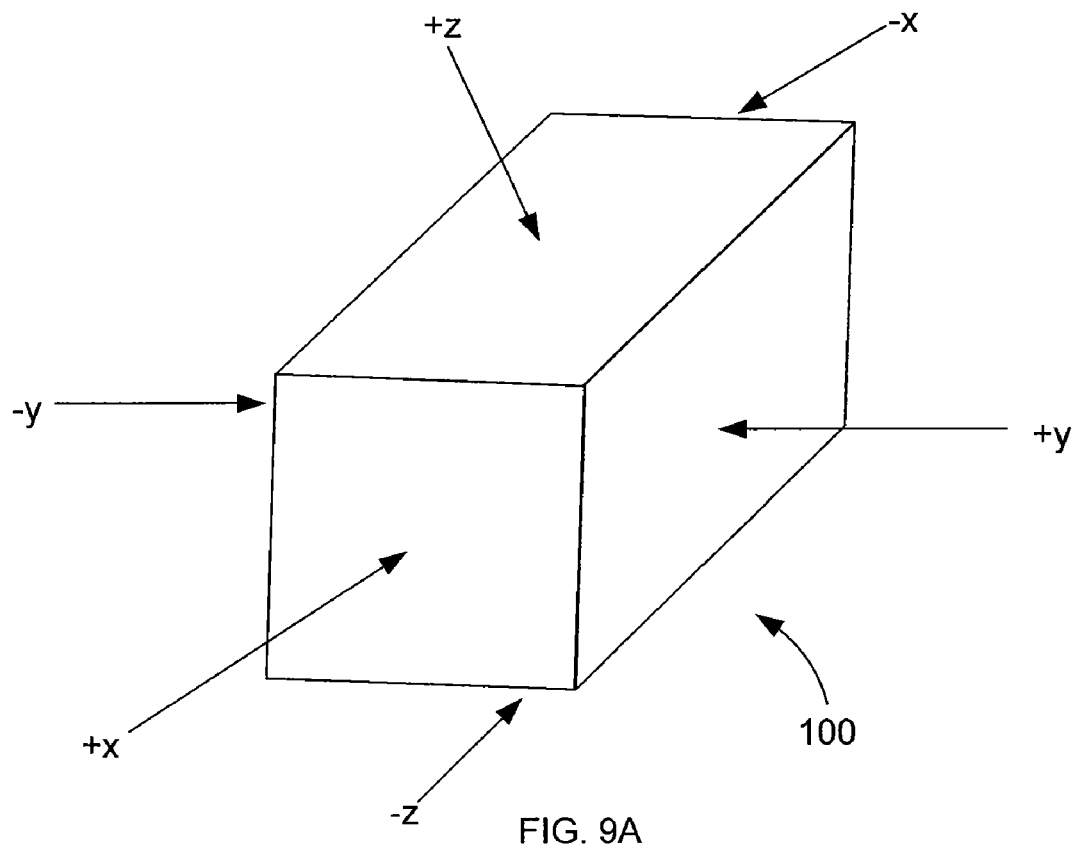
FIG. 9A is a perspective view of an initial monoblock used to form a quadrupole responder, along with a diagrammatic view of a coordinate system used in describing the quadrupole responder shown in the following figures.
Figure 9B:
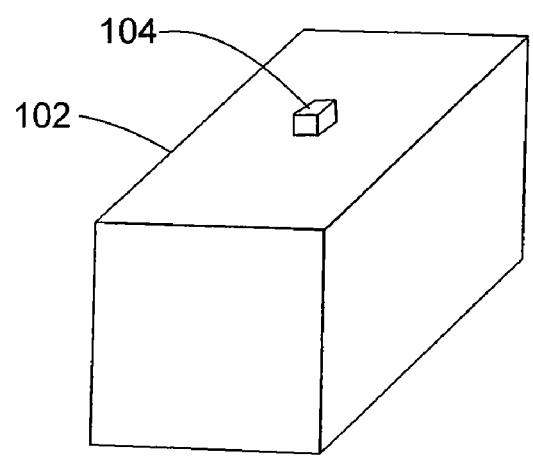
FIG. 9B is a perspective view of the balance beam and one of the torsion pins for the quadrupole responder to be sculpted out of the monoblock of FIG. 9A.

FIG. 9A illustrates an exemplary initial monoblock shape, being a rectangular block 100 with opposing parallel faces. For reference, the six faces of this block are labeled +x, −x, +y, −y, +z and −z; the same nomenclature is used to indicate the correspondingly-positioned faces of the balance beam. FIG. 9B illustrates the shape of the balance beam 102 and one of the two pins 104 (on the +z face of the balance beam) that are to be sculpted from the monoblock 100; an identical pin is also to be sculpted from the monoblock 100, co-linear to the pin 104 shown, with the second pin projecting from the −z face of the balance beam (and hence not visible in FIG. 9B). Pin 104 is shown as having a square cross-section, which is a shape that is achievable by this machining approach, as well as having the important requisite property of isoelasticity in response to translational accelerations of the balance beam with respect to the housing in the x and y directions. It will be evident that the initial monoblock 100 must be made larger than the balance beam 102 plus pins 104.

Figure 10A:
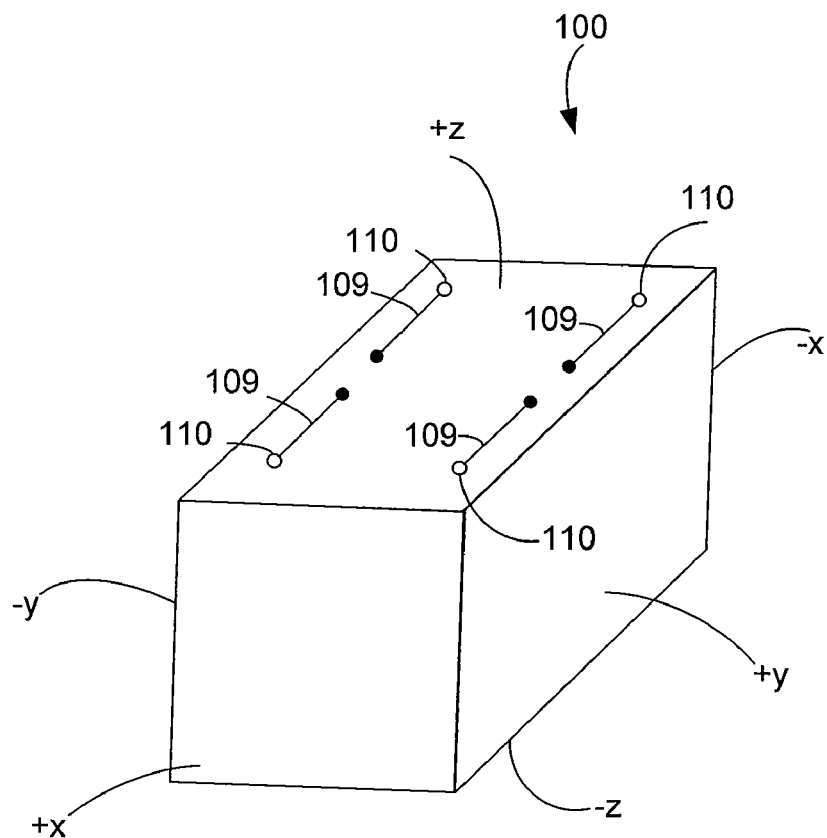
FIG. 10A is a perspective view of the monoblock of FIG. 9A, illustrating machining operations performed thereon.
Figure 10B:
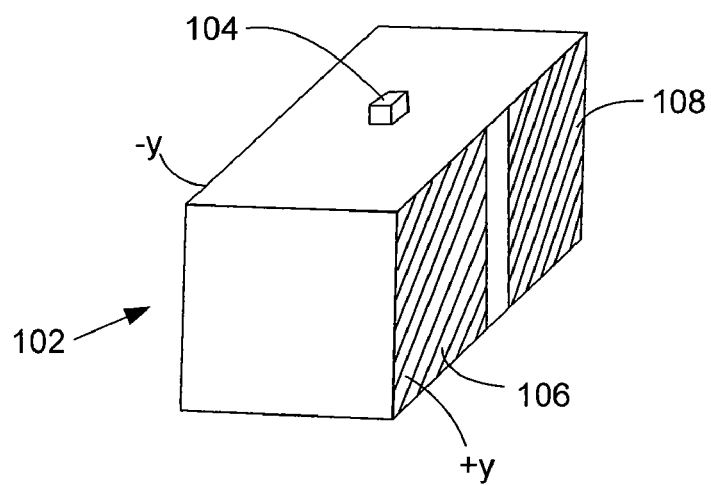
FIG. 10B is a perspective view of a balance beam for the quadrupole responder of FIG. 10A.

FIG. 10A indicates a set of machining operations which release portions of the +y and −y faces of the balance beam 102 from the monoblock 100, as partially indicated by the bottom-left-to-top-right cross-hatched areas 106, 108 on the +y face of the balance beam 102 in FIG. 10B (the corresponding areas on the −y face of the balance beam 102 will similarly be released, but are not shown cross-hatched in FIG. 10B as the −y face of the balance beam is not visible in FIG. 10B). The primary machining operations are a set of 4 cuts 109 which can be made by electrostatic discharge machining (EDM). Secondary machining operations in order to facilitate the EDM operations are also indicated, those being a set of 4 holes 110 formed perpendicular to the +z face of the monoblock 100, through the monoblock 100 to the −z face of the monoblock; these could be formed via several alternate means, for example via drilling or via plunge-EDM cutting. The aforementioned EDM operations each involve threading an EDM wire through one of the 4 holes 110, then drawing the EDM wire in either the +x or −x direction in order to form the planar cuts 109 that are parallel to the +y and −y faces of the monoblock.

Figure 11A:
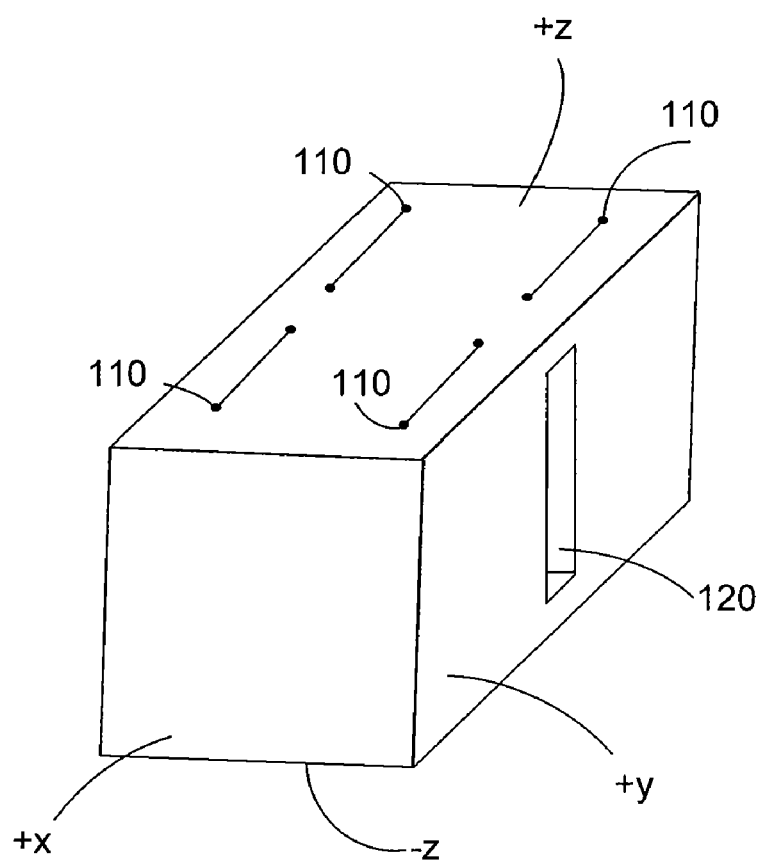
FIG. 11A is a perspective view of the monoblock of FIG. 10A, illustrating machining operations performed thereon.
Figure 11B:
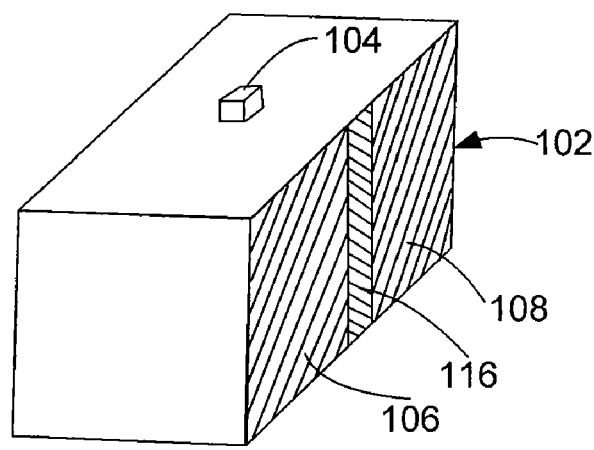
FIG. 11B is a perspective view of a balance beam for the quadrupole responder of FIG. 11A.

FIG. 11A indicates a machining operation which releases the remainder of the +y face of the balance beam 102 from the monoblock 100, as indicated by the top-left-to-bottom-right cross-hatched area 116 on the +y face of the balance beam in FIG. 11B. This is a milling operation, in which a milling tool approaches the monoblock 100 from the +y direction, milling a rectangular slot 120 out from the monoblock to a depth just sufficient to reach the +y surface of the balance beam 102. The height of the milled slots 120 in the +z/−z direction is preferably made large enough to completely release the balance beam 102 +y face in that direction. The width of the milled slots 120 in the +x/−x direction is preferably made large enough to meet or overlap the portions of the +y face of the balance beam 102 that were released in the previous EDM operation. Note that a similar milling operation is to be carried out on the −y face of the monoblock 100 as well, in order to release the remaining area of the −y face of the balance beam 102.

At this point, the +y and −y faces of the balance beam 102 have been completely released from the initial monoblock 100, as shown in FIG. 11B.

Figure 12A:
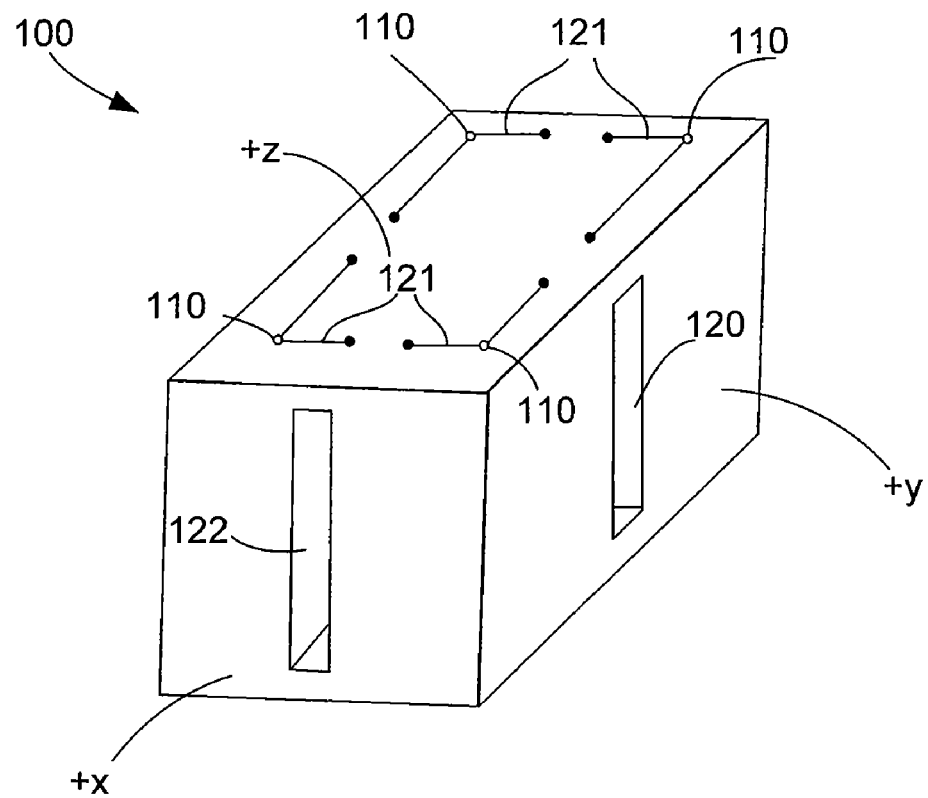
FIG. 12A is a perspective view of the monoblock of FIG. 11A illustrating additional machining operations performed thereon.
Figure 12B:
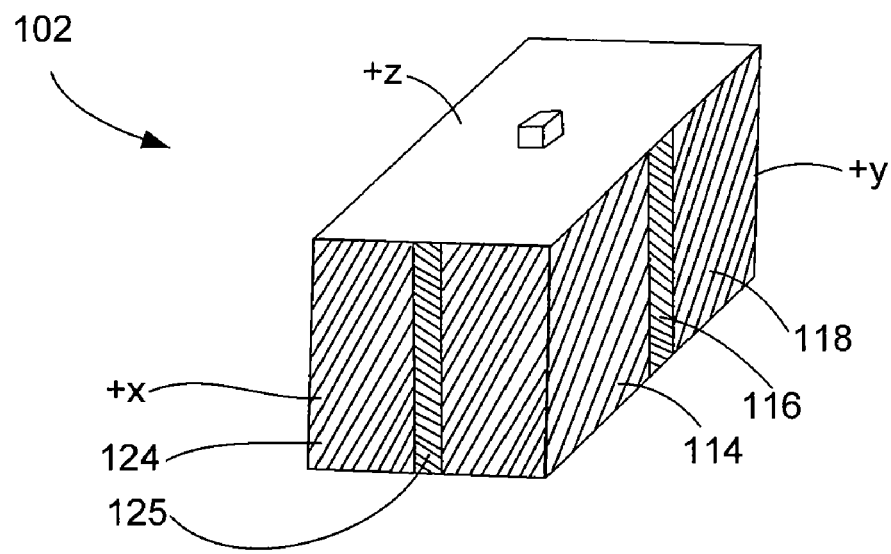
FIG. 12B is a perspective view of a balance beam of the quadrupole responder of FIG. 12A.

FIG. 12A indicates a set of machining operations which release the +x and −x faces of the balance beam 102 from the monoblock 100. Four EDM cuts 121 are made by first passing an EDM wire through the four drilled holes 110 that were first shown in FIG. 10A, then drawing those wires in the +y or −y directions in order to form the planar cuts 121 that are parallel to the +x and −x faces of the monoblock 100. The portions of the +x face of the balance beam 102 that are released by these operations are indicated by the bottom left to top right cross-hatched areas 124 on that face in FIG. 12B (the corresponding areas on the −x face of the balance beam will similarly be released, but are not shown cross-hatched in FIG. 12B as the −x face of the balance beam 102 is not visible in FIG. 12B). Two milled slots 122 are then made, one in each of the +x and −x faces of the monoblock 100 (the slot 122 in the +x face is shown in FIG. 12A), which release the remaining portions of the +x and −x faces of the balance beam from the monoblock 100. The portion of the +x face of the monoblock released by these milling operations is shown in top-left-to-bottom-right cross-hatching 125 in FIG. 12B. (The corresponding area on the −x face of the balance beam will similarly be released, but is not shown cross-hatched in FIG. 12B as the −x face of the balance beam is not visible in FIG. 12B). The height of the milled slots 122 in the +z/−z direction is preferably made large enough to completely release the balance beam's +x and −x faces in that direction. The width of the milled slots 122 in the +y/−y direction is preferably made large enough to meet or overlap the portions of the +x and −x faces of the balance beam 102 that were released in the previous EDM operation.

At this point, the +y, −y, +x and −x faces of the balance beam have been completely released from the initial monoblock.

Figure 13A:
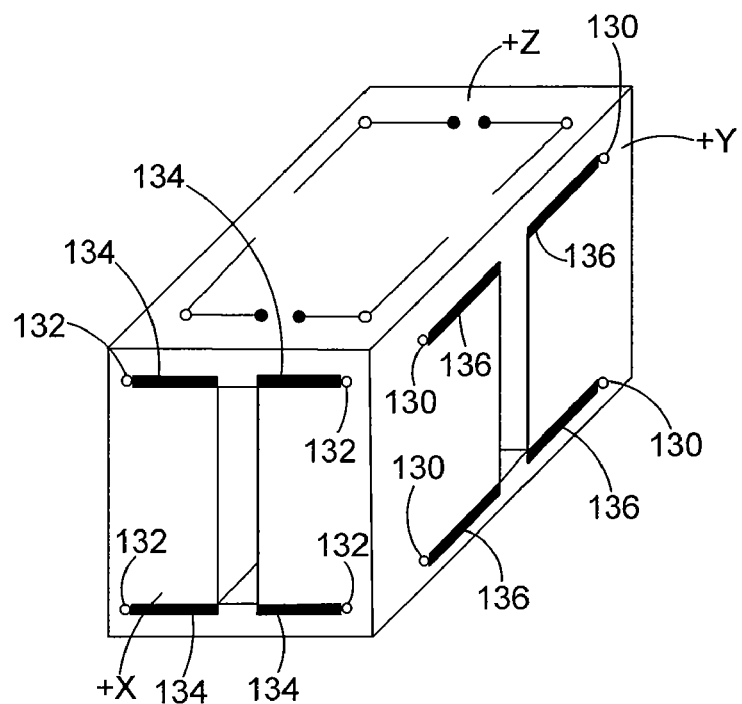
FIG. 13A is a perspective view of the monoblock of FIGS. 10A, 11A and 12A, illustrating further machining operations performed thereon.
Figure 13B:
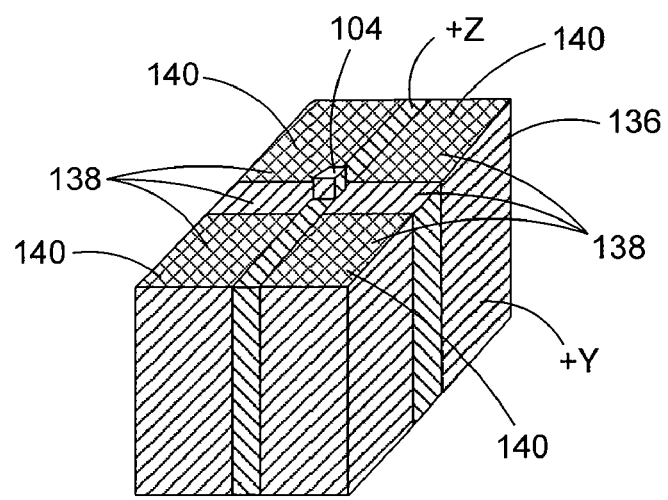
FIG. 13B is a perspective view of a balance beam formed from the monoblock of FIG. 13A.

FIG. 13A indicates a set of machining operations which release the +z and −z faces of the balance beam from the monoblock, as well as forming the two pins 104. These operations involve first forming a set of four holes 130 perpendicular to the +y face through to the −y face, and forming another set of four holes 132 perpendicular to the +x face through to the −x face; these could be formed via several alternate means, e.g. via drilling or via plunge-EDM cutting. The next set of operations involves making a set of EDM cuts 134, 136 parallel to the +z and −z faces of the monoblock, by first threading an EDM wire through each of the eight holes 130 and 132, then drawing the EDM wire in either the +x, −x, or the +y or −y direction. The EDM cuts 134 made by the wires that are threaded through the holes 132 in the +x, −x direction, will release the portions of the +z face of the balance beam that are indicated using bottom-left-to-top-right cross-hatching 138 shown in FIG. 13B. The EDM cuts 136 made by the wires that are threaded through the holes 130 in the +y/−y direction, will release the portions of the +z face of the balance beam that are indicated using top-left-to-bottom-right cross-hatching 140 in FIG. 13B. (Portions 140 overlap to some extent with portions 138). The corresponding areas of the −z face will also be similarly released via these operations.

The two pins 104 will also be formed by these operations. The thickness of these EDM cuts, at least in the region of the pins 104, is preferably equal to the desired height (i.e. in the +z/−z direction) of the torsion pins. This can be done by using an EDM wire thick enough to form the pins 104 using a single pass in each EDM cut. Alternately, it can be done by making multiple EDM passes using a thinner EDM wire, to shave off sequential layers of the monoblock 100 parallel to the +z and −z faces of the monoblock 100.

There are several dimensional parameters associated with these operations, which may have a large effect on the performance of a gravity gradiometer made using the resulting quadrupole responders. These include the thickness of the pins 104 in the x and y directions, and the height of the pins in the z direction, and which will all need to be cut to within a very small tolerance of their specified values. This can be accomplished via making initial coarse EDM cuts, followed by measurement of the resulting torsion pin dimensions, followed by subsequent fine EDM cuts to trim the torsion pin dimensions to their final values.

Note that for the balance beam 102, the torsion pins 104 do not have the circular cross-section shown in the prior embodiments. Instead, they have a square cross-section, as shown for pins 104 in FIG. 13B. Note also that while the parts 104 have been referred to as the pins, each may in fact consist of a large boss (like bosses 44 of FIGS. 4 and 5 and bosses 72 of FIGS. 7 and 8) and a small flexure region located between the ends of the large boss. The effect of the square versus circular cross-section will be discussed below.

At this point, the +y, −y, +x, −x, +z and −z faces of the balance beam 102 have been completely released from the initial monoblock 100, and the +z and −z pins 104 have also been sculpted out. The balance beam 102 remains connected to the remainder of the initial monoblock, which now comprises the housing for the quadrupole responder, by the two pins. While various cuts remain in the outer, housing portion of the monoblock, these have been designed to leave enough material in place to ensure the structural integrity of the housing.

Figure 14A:
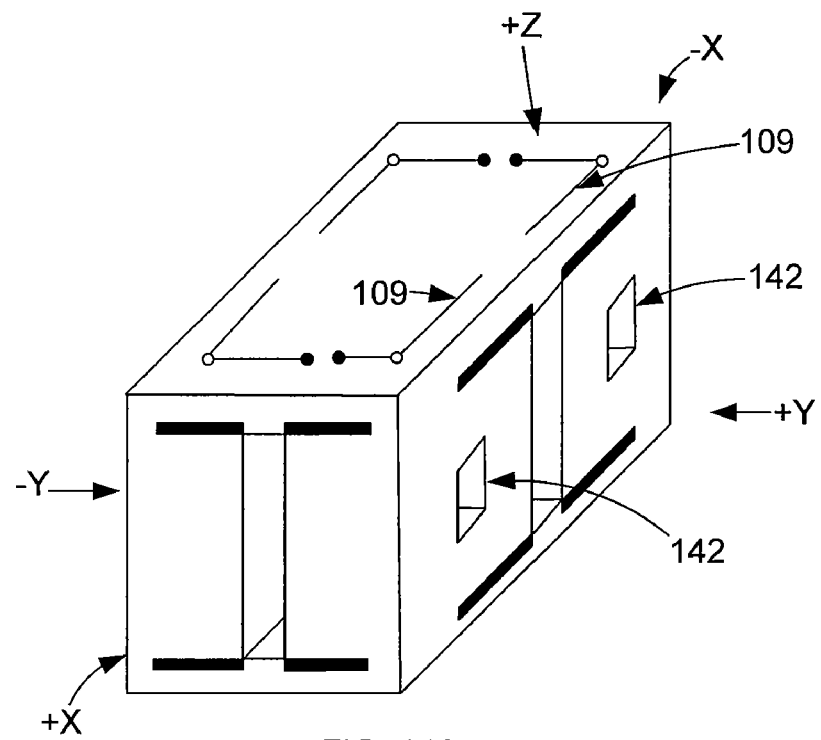
FIG. 14A is a perspective view showing pockets formed in the housing of FIG. 13B.
Figure 14B:
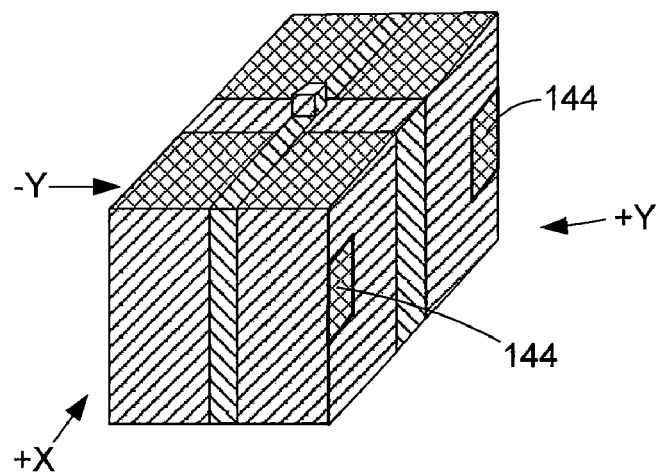
FIG. 14B is a perspective view showing the location for gap sensors for the balance beam of FIG. 14A.

In order to complete a functioning quadrupole responder, devices such as gap sensors and motion-limiting stops must be added. These must be located immediately adjacent to the balance beam, which is embedded within the housing, and so further removal of material from the housing must be done to accommodate these. FIG. 14A indicates exemplary pockets 142 machined into the +y face of the housing, which can be accomplished by milling perpendicularly in from the +y face in the −y direction to the depth of the slots 109. Gap-sensors inserted into these pockets would then be adjacent to the areas 144 of the +y face of the balance beam, as indicated in FIG. 14B. Gap-sensors placed in these locations would be sensitive to the rotation of the balance beam about the torsional flexure axis. Additional sensors can similarly be placed in pockets machined into, for example, the −y face of the housing. Similar operations would allow the emplacement of motion-limiting stops (not shown).

Note that a very specific set of machining operations has been described in the foregoing, in order to illustrate as clearly and simply as possible the principle of this invention. Clearly, those operations could be carried out in a sequence different from the one presented, while achieving the same effect. Also, alternate machining operations could be used instead, with similar effect, in order to achieve the sculpting-out of the balance beam, torsion pins and sensor pockets from the initial monoblock.

The foregoing exemplary description, and accompanying drawings, pertain to a quadrupole responder comprising a balance beam having a prismatic shape with a rectangular cross-section that is sculpted from a similarly rectangular cross-section prismatic initial monoblock, leaving these two connected by a pair of co-linear torsion pins of square cross-section. These particular shapes are chosen for this example because, due to their geometric simplicity, they allow for maximum clarity in illustrating the main principles of this invention. However, this exemplary description is not intended to limit the application of this invention to the geometric details of this example. Other geometries and related sensor placements could also be used. It is readily apparent that through a series of steps similar to those described here, a balance beam and pins may similarly be sculpted from an initial monoblock having a different shape, and that a balance beam and isoelastic torsion pins having different shapes may be sculpted from an initial monoblock. As a specific example of another balance beam shape, this approach may alternatively be used to sculpt a bowtie shaped balance beam, similar in shape to that shown in FIGS. 1 to 8 (above), from a prismatic rectangular cross-section initial monoblock. Regarding torsion pin cross-section shape, it can be shown that if the two principal second moments of area of the torsion flexure cross-sections (such as the square cross-section of FIG. 13B) are equal, then the quadrupole responder will be isoelastic with respect to translational motions of the balance beam with respect to the housing in the x and y directions, and hence with respect to inertial loads on the balance beam resulting from translational acceleration of the housing in the x and y directions. In other words, each of the pins has a cross-section at every point along a portion of the axis of rotation axis within each pin. A pair of orthogonal axes may be defined within said cross-section. The pair of orthogonal axes may intersect with and be orthogonal to the axis of rotation. The second moments of area about each of said orthogonal axes of the cross-section may be equal. Other specific examples of torsion flexure cross-section shapes having this property are a circle and a regular octagon, the latter being achievable by straightforward variations of the machining operations described above.

It has been assumed in this description that the two torsion flexure regions, such as torsion flexure regions 74 shown in FIGS. 7 and 8, are identical with each other in cross-sectional shape and in dimensions. In general, this is preferred (i.e. that the two torsion flexure regions, one on each side of the balance beam, are identical in cross-sectional shape and size, and in length). If this is the case (which will be referred to as the two flexure regions being symmetric with each other), then the response to either one of the two sideways accelerations referred to in connection with FIG. 15B will be in pure sideways displacement of the balance beam with respect to the housing, in the direction opposite to the acceleration, with no rotation of the balance beam with respect to the housing. This is referred to as an isoelastic response, and the quadrupole responder is (as described above) isoelastic with respect to inertial loads on the balance beam resulting from translational acceleration of the housing in the x and y directions.

If the two torsion flexure regions 74 are asymmetric with respect to each other (meaning that one of the torsion flexure regions 74 on one side of the balance beam has a different cross-sectional shape or size, and/or a different length from the torsion flexure region 74 on the other side of the balance beam), then this may (depending on the specific values for the lengths of the two pins, and their cross-sectional dimensions) result in rotation of the balance beam with respect to the housing in response to accelerations of the housing in the x and y directions (as defined in FIG. 9), the axis of such rotations being perpendicular to the flexure (z) axis. This additional rotation, to a first order, is not expected to affect the output of the gravity gradient sensing channel of the instrument, since it will cause each half of some of the gap-sensing elements to become non-planar with respect to each other, but there will be no change in the average distance between one half and the other half of any of the gap-sensing elements. However, there may be nonlinear components in the response of the gap-sensing elements to this type of motion; the maximum acceptable amount of such nonlinear response can be used to set an upper limit on the maximum acceptable deviation in length or cross-sectional dimensions between the two pins, resulting either by design or by machining inaccuracies.

Note that in either case, the enlarged portions of the bosses (e.g. of bosses 72, FIGS. 7 and 8) contribute negligibly to the movements of the balance beam permitted by the smaller diameter flexure regions 74. This is because the enlarged portions of the bosses 72 are preferably substantially thicker than the flexure regions 74.

In the above embodiments, the pins have generally straight sides. In alternate embodiments, the pins may have curved sides or filleted ends. This may reduce stress concentrations.

While preferred embodiments of the invention have been described, it will be understood that various changes can be made within the scope of the invention.

The invention claimed is:

1. A quadrupole responder for an OQR-type gravity gradiometer comprising:
   (a) a housing;
   (b) a mass quadrupole positioned within the housing, said mass quadrupole having a pair of opposing quadrupole faces and a center of mass between said opposing quadrupole faces;
   (c) at least a pair of torsion spring flexures provided by pins connecting said opposing quadrupole faces of said mass quadrupole to the housing, said torsion spring flexures providing an axis of rotation which passes through the center of mass of said mass quadrupole and through both spring flexures; and,
   (d) a pair of bosses, each boss being integral with and coaxial with one of the pins, and each boss being located outwardly of one of the pins;
   wherein said pins are integral with said mass quadrupole; and further,
   wherein said housing has two halves, each half containing at least one V-shaped notch, said V-shaped notches from each half of the housing together forming a clamp around one of the bosses, said one of the bosses being diffusion bonded to said housing at said notches.

2. The quadrupole responder of claim 1, wherein each pin has a first thickness, and each boss has a second thickness, said second thickness being greater than said first thickness.

3. The quadrupole responder according to claim 1, wherein said pins are fixedly connected to the housing by the bosses.

4. The quadrupole responder according to claim 1, wherein said pins and said bosses are of circular cross-section and wherein said first thickness is a first diameter and said second thickness is a second diameter.

5. The quadrupole responder according to claim 1, wherein each of said pins has a cross-section at every point along a portion of the axis of rotation within each pin, wherein a pair of orthogonal axes are defined within said cross-section, wherein said pair of orthogonal axes intersect with and are also orthogonal to said axis of rotation, wherein the second moments of area about each of said orthogonal axes of the cross-section are equal.

6. The quadrupole responder of claim 5, wherein said pins are of one of a square, a circular, and an octagonal cross-section.

7. The quadrupole responder according to claim 1, wherein each of said bosses is bonded to said housing.

8. The quadrupole responder according to claim 7, wherein each of said bosses is diffusion bonded to said housing.

9. The quadrupole responder according to claim 1, wherein said mass quadrupole is located between said halves, and further wherein each of said bosses projects into and is bonded to each of said halves.

10. The quadrupole responder according to claim 1, wherein said torsion spring flexures provide a combined torsional stiffness about said axis which results in a desired resonant frequency for rotational motion of the mass quadrupole about said axis with respect to the housing.

11. The quadrupole responder according to claim 1, wherein said housing, said pins, and said mass quadrupole are fabricated from niobium.

12. The quadrupole responder according to claim 1, wherein the housing comprises side faces, and the pins are positioned orthogonally to the side faces.

13. The quadrupole responder according to claim 1, wherein the housing defines a volume in which the mass quadrupole is housed, and the volume has substantially the same shape as the mass quadrupole.

14. The quadrupole responder according to claim 13, wherein the volume defines a gap between the mass quadrupole and the housing.

15. The quadrupole responder according to claim 14, wherein the pins are adapted to permit the mass quadrupole to move rotationally about said axis within the gap.

16. The quadrupole responder according to claim 15, further comprising at least one sensor mounted in the housing and configured to detect a change in distance between the mass quadrupole and the housing.

17. The quadrupole responder according to claim 16, wherein the at least one sensor is mounted in a pocket adjacent the gap.

18. The quadrupole responder according to claim 1, wherein said pins provide a first resonant frequency for rotation of said mass quadrupole about said axis and additional resonant frequencies for motions of said mass quadrupole in other rotational and translational vibration modes, said first resonant frequency being lower than said additional resonant frequencies.

19. The quadrupole responder according to claim 1, wherein each of said pins defines a longitudinal axis, wherein said longitudinal axis of each pin is co-linear with said axis of rotation.

20. The quadrupole responder according to claim 19, wherein each of said pins is located orthogonally to a corresponding one of said opposing quadrupole faces.

21. The quadrupole responder according to claim 20, wherein each of said opposing quadrupole faces is a planar surface, and wherein said planar surfaces of each of said opposing quadrupole faces are oriented in parallel relation to each other.

22. The quadrupole responder according to claim 21, wherein said longitudinal axis is a center-line of said pin.

23. A method of making a quadrupole responder for an OQR-type gravity gradiometer, said responder including a housing, a mass quadrupole positioned within the housing, said mass quadrupole having a pair of opposing quadrupole faces, and a center of mass between said opposing quadrupole faces, at least a pair of torsion spring flexures provided by pins connecting said opposing quadrupole faces of said mass quadrupole to the housing, said torsion spring flexures providing an axis of rotation which passes through the center of mass of said mass quadrupole and through both spring flexures, and a pair of bosses, each boss integral with and coaxial with one of the pins, and each boss being located outwardly of one of the pins, said method comprising:
   (a) providing said housing in at least two parts;
   (b) assembling said parts of said housing with said mass quadrupole and clamping said bosses between said at least two parts of said housing; and
   (c) bonding said bosses with the assembled housing parts.

24. The method according to claim 23, wherein said parts of said housing include top and bottom parts, each having at least one V-shaped notch therein, the V-shaped notches together being adapted to clamp said bosses to said housing when said housing parts are assembled with said mass quadrupole.

25. The method according to claim 23, wherein each of said two housing parts includes a half hole, at least one of the half holes having a combination of radial outward cut or cuts connected to annular cuts so that an appropriate clamping pressure is exerted on the bosses when said housing parts are assembled with said mass quadrupole, said half holes having at least some dimensions smaller than those of the bosses to provide an interference fit, thereby providing appropriate clamping pressure.

26. The method according to claim 25, further including a step of forming an opening in at least one housing part adjacent the half-hole therein, to provide flexibility at the surface of said half-hole and thus to improve the uniformity of application of clamping pressure.

27. The method according to claim 26, wherein said opening includes an annular slot.

28. The method according to claim 23, wherein said bonding is performed by diffusion bonding.

29. The method according to claim 23, wherein said torsion spring flexures provide a combined torsional stiffness which results in a desired resonant frequency for rotational motion about the axis of the mass quadrupole with respect to the housing.

30. A method of forming a quadrupole responder for an OQR-type gravity gradiometer, said gravity gradiometer comprising (a) a housing, (b) a mass quadrupole positioned within the housing, said mass quadrupole having a pair of opposing quadrupole faces and a center of mass between said opposing quadrupole faces, and (c) at least a pair of torsion spring flexures provided by pins connecting said opposing quadrupole faces of said mass quadrupole to the housing, said torsion spring flexures providing an axis of rotation which passes through the center of mass of said mass quadrupole and through both spring flexures, said method comprising: selecting a monoblock of a material and then cutting said monoblock to form said housing, said mass quadrupole and said spring flexures as a single integral structure, wherein said spring flexures are connected to said opposing quadrupole faces.

31. The method according to claim 30, wherein said cutting is performed by electrostatic discharge machining.

32. The method according to claim 31, wherein said cutting includes milling.

33. The method according to claim 32, wherein said cutting and milling release successive faces of said mass quadrupole from said monoblock.

34. The method according to claim 30, wherein said torsion spring flexures provide a combined torsional stiffness which results in a desired resonant frequency for rotational motion about the axis of the mass quadrupole with respect to the housing.

35. The method according to claim 30, wherein said monoblock is selected from one of a homogeneous and a heterogeneous composition.

36. The method according to claim 35, wherein said monoblock is homogeneous and comprises niobium.

37. The method according to claim 35, wherein said monoblock is heterogeneous and comprises niobium and titanium.

38. The method according to claim 30, further comprising forming one or more pockets in the housing adjacent the mass quadrupole, and inserting sensors into the one or more pockets.

* * * * *